(12) United States Patent
Akutsu et al.

(10) Patent No.: US 7,180,848 B2
(45) Date of Patent: Feb. 20, 2007

(54) OPTICAL INFORMATION RECORDING MEDIUM

(75) Inventors: Osamu Akutsu, Fujisawa (JP); Saturo Yamashita, Yokohama (JP); Katsunori Ohshima, Kamakura (JP); Kenji Oishi, Yokohama (JP)

(73) Assignee: Victor Company of Japan, Ltd., Yokohama (JP)

( * ) Notice: Subject to any disclaimer, the term of this patent is extended or adjusted under 35 U.S.C. 154(b) by 599 days.

(21) Appl. No.: 10/752,037

(22) Filed: Jan. 7, 2004

(65) Prior Publication Data

US 2004/0142277 A1   Jul. 22, 2004

(30) Foreign Application Priority Data

Jan. 7, 2003   (JP) ............................. 2003-001602

(51) Int. Cl.
G11B 11/00   (2006.01)
B32B 3/02   (2006.01)

(52) U.S. Cl. .................. 369/275.2; 428/64.1

(58) Field of Classification Search ............. 369/275.2, 369/288
See application file for complete search history.

(56) References Cited

U.S. PATENT DOCUMENTS

| | | | |
|---|---|---|---|
| 5,882,759 A | * | 3/1999 | Hirotsune et al. ......... 428/64.1 |
| 6,033,535 A | | 3/2000 | Ohno et al. |
| 6,383,595 B1 | | 5/2002 | Hirotsune et al. |
| 6,528,138 B2 | * | 3/2003 | Meinders et al. .......... 428/64.1 |
| 6,580,678 B2 | * | 6/2003 | Kondo et al. ............ 369/275.2 |
| 6,656,559 B2 | * | 12/2003 | Mizushima et al. ....... 428/64.1 |
| 6,670,014 B2 | * | 12/2003 | Nishihara et al. ......... 428/64.1 |
| 2001/0016242 A1 | | 8/2001 | Makoto et al. |

FOREIGN PATENT DOCUMENTS

| | | |
|---|---|---|
| EP | 0 335 469 A | 10/1989 |
| EP | 0 541 376 A | 5/1993 |
| JP | 2002-172860 | 6/2002 |

\* cited by examiner

*Primary Examiner*—Hoa Nguyen
(74) *Attorney, Agent, or Firm*—Connolly Bove Lodge & Hutz LLP

(57) ABSTRACT

An optical information recording medium is composed of at least a phase-change type recording layer 4 provided on a substrate 1. The optical information recording medium is conducted to record and erase information by changing a phase of the phase-change type recording layer by irradiating light. The phase-change type recording layer is further composed of $Ti_wGe_xSb_yTe_z$, wherein each of w, x, y and z is in atomic percent and satisfies following relations: $0.5 \leq w \leq 4.0$, $3.4 \leq x \leq 14.5$, $2.1 \leq y/z \leq 4.0$ and $w+x+y+z=100$.

1 Claim, 8 Drawing Sheets

| | Sample No. | | | | | | | |
|---|---|---|---|---|---|---|---|---|
| | 4 | 4 – v1 | 4 – v2 | 4 – v3 | 4 – v4 | 4 – v5 | 4 – v6 | 4 – v7 |
| Ge [%] | 4.3 | 4.3 | 4.3 | 4.3 | 4.3 | 4.3 | 4.3 | 4.3 |
| Sb [%] | 65.1 | 64.5 | 64.2 | 63.5 | 62.8 | 62.1 | 61.4 | 60.8 |
| Te [%] | 30.6 | 30.7 | 30.5 | 30.2 | 29.9 | 29.6 | 29.3 | 28.5 |
| Ti [%] | 0.0 | 0.5 | 1.0 | 2.0 | 3.0 | 4.0 | 5.0 | 6.0 |
| Sb/Te | 2.1 | 2.1 | 2.1 | 2.1 | 2.1 | 2.1 | 2.1 | 2.1 |
| Durable reproduction power [mW] | 0.34 | 0.38 | 0.38 | 0.38 | 0.38 | 0.38 | 0.38 | 0.38 |
| Average initial jitter [%] | 8.52 | 7.48 | 7.14 | 7.08 | 7.22 | 7.76 | 9.04 | 10.12 |

| | Sample No. | | | | | | | |
|---|---|---|---|---|---|---|---|---|
| | 2 | 2 – v1 | 2 – v2 | 2 – v3 | 2 – v4 | 2 – v5 | 2 – v6 | 2 – v7 |
| Ge [%] | 3.4 | 3.4 | 3.4 | 3.4 | 3.4 | 3.4 | 3.4 | 3.4 |
| Sb [%] | 72.9 | 72.7 | 72.3 | 71.5 | 70.8 | 70.0 | 69.3 | 68.5 |
| Te [%] | 23.7 | 23.4 | 23.3 | 23.1 | 22.8 | 22.6 | 22.3 | 22.1 |
| Ti [%] | 0.0 | 0.5 | 1.0 | 2.0 | 3.0 | 4.0 | 5.0 | 6.0 |
| Sb/Te | 3.1 | 3.1 | 3.1 | 3.1 | 3.1 | 3.1 | 3.1 | 3.1 |
| Durable reproduction power [mW] | 0.34 | 0.38 | 0.38 | 0.38 | 0.38 | 0.38 | 0.38 | 0.38 |
| Average initial jitter [%] | 7.95 | 6.95 | 6.89 | 6.97 | 7.11 | 7.58 | 8.88 | 9.92 |

Fig. 4

| | Sample No. | | | | | | | |
|---|---|---|---|---|---|---|---|---|
| | 4 | 4 – v1 | 4 – v2 | 4 – v3 | 4 – v4 | 4 – v5 | 4 – v6 | 4 – v7 |
| Ge [%] | 4.3 | 4.3 | 4.3 | 4.3 | 4.3 | 4.3 | 4.3 | 4.3 |
| Sb [%] | 65.1 | 64.5 | 64.2 | 63.5 | 62.8 | 62.1 | 61.4 | 60.8 |
| Te [%] | 30.6 | 30.7 | 30.5 | 30.2 | 29.9 | 29.6 | 29.3 | 28.5 |
| Ti [%] | 0.0 | 0.5 | 1.0 | 2.0 | 3.0 | 4.0 | 5.0 | 6.0 |
| Sb/Te | 2.1 | 2.1 | 2.1 | 2.1 | 2.1 | 2.1 | 2.1 | 2.1 |
| Durable reproduction power [mW] | 0.34 | 0.38 | 0.38 | 0.38 | 0.38 | 0.38 | 0.38 | 0.38 |
| Average initial jitter [%] | 8.52 | 7.48 | 7.14 | 7.08 | 7.22 | 7.76 | 9.04 | 10.12 |

| | 7 | 7 – v1 | 7 – v2 | 7 – v3 | 7 – v4 | 7 – v5 | 7 – v6 | 7 – v7 |
|---|---|---|---|---|---|---|---|---|
| Ge [%] | 4.6 | 4.6 | 4.6 | 4.6 | 4.6 | 4.6 | 4.6 | 4.6 |
| Sb [%] | 76.2 | 75.9 | 75.5 | 74.7 | 73.9 | 73.1 | 72.3 | 71.5 |
| Te [%] | 19.2 | 19.0 | 18.9 | 18.7 | 18.5 | 18.3 | 18.1 | 17.9 |
| Ti [%] | 0.0 | 0.5 | 1.0 | 2.0 | 3.0 | 4.0 | 5.0 | 6.0 |
| Sb/Te | 4.0 | 4.0 | 4.0 | 4.0 | 4.0 | 4.0 | 4.0 | 4.0 |
| Durable reproduction power [mW] | 0.34 | 0.38 | 0.38 | 0.38 | 0.38 | 0.38 | 0.38 | 0.38 |
| Average initial jitter [%] | 8.28 | 7.42 | 7.02 | 6.82 | 6.98 | 7.36 | 8.51 | 9.63 |

Fig. 7

| | 9 | 9 – v1 | 9 – v2 | 9 – v3 | 9 – v4 | 9 – v5 | 9 – v6 | 9 – v7 |
|---|---|---|---|---|---|---|---|---|
| Ge [%] | 6.2 | 6.2 | 6.2 | 6.2 | 6.2 | 4.3 | 6.2 | 6.2 |
| Sb [%] | 69.2 | 68.7 | 68.4 | 67.6 | 66.9 | 66.2 | 65.4 | 64.7 |
| Te [%] | 24.6 | 24.6 | 24.4 | 24.2 | 23.9 | 23.6 | 23.4 | 23.1 |
| Ti [%] | 0.0 | 0.5 | 1.0 | 2.0 | 3.0 | 4.0 | 5.0 | 6.0 |
| Sb/Te | 2.8 | 2.8 | 2.8 | 2.8 | 2.8 | 2.8 | 2.8 | 2.8 |
| Durable reproduction power [mW] | 0.35 | 0.39 | 0.39 | 0.39 | 0.39 | 0.39 | 0.39 | 0.39 |
| Average initial jitter [%] | 8.05 | 6.91 | 6.78 | 6.65 | 6.84 | 7.09 | 8.25 | 9.32 |

Fig. 8

| | 15 | 15 – v1 | 15 – v2 | 15 – v3 | 15 – v4 | 15 – v5 | 15 – v6 | 15 – v7 |
|---|---|---|---|---|---|---|---|---|
| | | | | Sample No. | | | | |
| Ge [%] | 8.7 | 8.7 | 8.7 | 8.7 | 8.7 | 8.7 | 8.7 | 8.7 |
| Sb [%] | 69.7 | 69.2 | 68.8 | 68.0 | 67.3 | 66.5 | 65.8 | 65.0 |
| Te [%] | 21.6 | 21.6 | 21.5 | 21.3 | 21.0 | 20.8 | 20.5 | 20.3 |
| Ti [%] | 0.0 | 0.5 | 1.0 | 2.0 | 3.0 | 4.0 | 5.0 | 6.0 |
| Sb/Te | 3.2 | 3.2 | 3.2 | 3.2 | 3.12 | 3.2 | 3.2 | 3.2 |
| Durable reproduction power [mW] | 0.35 | 0.39 | 0.39 | 0.39 | 0.39 | 0.39 | 0.39 | 0.39 |
| Average initial jitter [%] | 7.80 | 6.71 | 6.63 | 6.68 | 6.78 | 6.95 | 8.14 | 9.22 |

Fig. 9

| | 16 | 16 – v1 | 16 – v2 | 16 – v3 | 16 – v4 | 16 – v5 | 16 – v6 | 16 – v7 |
|---|---|---|---|---|---|---|---|---|
| | | | | Sample No. | | | | |
| Ge [%] | 11.1 | 11.1 | 11.1 | 11.1 | 11.1 | 11.1 | 11.1 | 11.1 |
| Sb [%] | 69.2 | 68.8 | 68.4 | 67.6 | 66.8 | 66.0 | 65.3 | 64.5 |
| Te [%] | 19.7 | 19.6 | 19.5 | 19.3 | 19.1 | 18.9 | 18.6 | 18.4 |
| Ti [%] | 0.0 | 0.5 | 1.0 | 2.0 | 3.0 | 4.0 | 5.0 | 6.0 |
| Sb/Te | 3.5 | 3.5 | 3.5 | 3.5 | 3.5 | 3.5 | 3.5 | 3.5 |
| Durable reproduction power [mW] | 0.36 | 0.4 | 0.4 | 0.4 | 0.4 | 0.4 | 0.4 | 0.4 |
| Average initial jitter [%] | 8.11 | 7.02 | 6.95 | 6.82 | 6.88 | 7.25 | 8.48 | 9.64 |

| | Sample No. | | | | | | | |
|---|---|---|---|---|---|---|---|---|
| | 17 | 17–v1 | 17–v2 | 17–v3 | 17–v4 | 17–v5 | 17–v6 | 17–v7 |
| Ge [%] | 14.5 | 14.5 | 14.5 | 14.5 | 14.5 | 14.5 | 14.5 | 14.5 |
| Sb [%] | 65.3 | 64.8 | 64.4 | 63.6 | 62.9 | 62.1 | 61.3 | 60.6 |
| Te [%] | 20.2 | 20.2 | 20.1 | 19.9 | 19.6 | 19.4 | 19.2 | 18.9 |
| Ti [%] | 0.0 | 0.5 | 1.0 | 2.0 | 3.0 | 4.0 | 5.0 | 6.0 |
| Sb/Te | 3.2 | 3.2 | 3.2 | 3.2 | 3.2 | 3.2 | 3.2 | 3.2 |
| Durable reproduction power [mW] | 0.36 | 0.4 | 0.4 | 0.4 | 0.4 | 0.4 | 0.4 | 0.4 |
| Average initial jitter [%] | 8.02 | 7.14 | 7.05 | 7.02 | 7.16 | 7.28 | 8.55 | 9.78 |

| Sample No. | Recording power [mW] | | | | Strategy [T] | | | |
|---|---|---|---|---|---|---|---|---|
| | P1 | P2 | P3 | P4 | T1 | T2 | T3 | T4 |
| 2 | 5.2 | 2.7 | 0.1 | 0.1 | 0.4 | 0.4 | 0.7 | 0.7 |
| 4 | 5.2 | 2.7 | 0.1 | 0.1 | 0.4 | 0.4 | 0.7 | 0.7 |
| 7 | 5.2 | 3.4 | 0.1 | 0.1 | 0.5 | 0.5 | 0.8 | 0.8 |
| 9 | 5.2 | 2.7 | 0.1 | 0.1 | 0.4 | 0.4 | 0.7 | 0.7 |
| 15 | 5.2 | 2.7 | 0.1 | 0.1 | 0.4 | 0.4 | 0.7 | 0.7 |
| 16 | 5.2 | 3.4 | 0.1 | 0.1 | 0.5 | 0.5 | 0.8 | 0.8 |
| 17 | 5.2 | 2.7 | 0.1 | 0.1 | 0.4 | 0.4 | 0.7 | 0.7 |

Fig. 12

| Sample No. | Reproduction power 0.3 [mW] C/N [dB] | | Reproduction power 0.38 [mW] C/N [dB] | |
|---|---|---|---|---|
| | Immediately after | 5 minutes after | Immediately after | 5 minutes after |
| 2 – v1 to 2 – v5 | 50.2 | 50.2 | 51.1 | 51.1 |
| 4 – v1 to 4 – v5 | 50.1 | 50.1 | 51.1 | 51.1 |
| 7 – v1 to 7 – v5 | 50.2 | 50.2 | 51.2 | 51.2 |
| 9 – v1 to 9 – v5 | 50.3 | 50.4 | 51.3 | 51.2 |
| 15 – v1 to 15 – v5 | 50.4 | 50.1 | 51.4 | 51.4 |
| 16 – v1 to 16 – v5 | 50.2 | 50.2 | 51.2 | 51.2 |
| 17 – v1 to 17 – v5 | 50.2 | 50.2 | 51.3 | 51.3 |

| Sample No. | Ge [%]. | Sb [%]. | Te [%]. | Sb/Te. | Deteriorated reproduction less than 0.2 dB | Jitter less than 9% |
|---|---|---|---|---|---|---|
| 1 | 2.3 | 74.1 | 23.6 | 3.1 | | |
| 2 | 3.4 | 72.9 | 23.7 | 3.1 | Yes | Yes |
| 3 | 4.2 | 63.2 | 32.6 | 1.9 | | Yes |
| 4 | 4.3 | 65.1 | 30.6 | 2.1 | Yes | Yes |
| 5 | 4.5 | 67.8 | 27.7 | 2.4 | Yes | Yes |
| 6 | 4.5 | 78.2 | 17.3 | 4.5 | | Yes |
| 7 | 4.6 | 76.2 | 19.2 | 4.0 | Yes | Yes |
| 8 | 4.8 | 71.9 | 23.3 | 3.1 | Yes | Yes |
| 9 | 6.2 | 69.2 | 24.6 | 2.8 | Yes | Yes |
| 10 | 6.4 | 70.6 | 23.0 | 3.1 | Yes | Yes |
| 11 | 6.5 | 70.2 | 23.3 | 3.0 | Yes | |
| 12 | 7.2 | 75.4 | 17.4 | 4.3 | Yes | |
| 13 | 7.8 | 60.2 | 32.0 | 1.9 | Yes | |
| 14 | 8.5 | 72.1 | 19.4 | 3.7 | Yes | Yes |
| 15 | 8.7 | 69.7 | 21.6 | 3.2 | Yes | Yes |
| 16 | 11.1 | 69.2 | 19.7 | 3.5 | Yes | Yes |
| 17 | 14.5 | 65.3 | 20.2 | 3.2 | Yes | |
| 18 | 15.8 | 66.5 | 17.7 | 3.8 | Yes | |

Fig. 13

OPTICAL INFORMATION RECORDING MEDIUM

BACKGROUND OF THE INVENTION

1. Field of the Invention

The present invention relates to an optical information recording medium, wherein recording or erasing information is conducted by changing configuration of atoms constituting a recording layer by irradiating light.

2. Description of the Related Art

A so-called phase-change type optical information recording medium has been well known as one of optical memory mediums, which enable to record, reproduce or erase information by irradiating a laser beam. Such a phase-change type optical information recording medium-uses transition between crystal and amorphous or between two crystalline phases of crystal 1 and crystal 2.

A thin film of chalcogen system alloy is commonly used as a material for recording layer of a phase-change type optical information recording medium. A thin film of GeSbTe system alloy or AgInSbTe system alloy among the chalcogen system alloys has been practically applied for an optical information recording medium such as a rewritable optical disc.

A recording principle of such a rewritable optical disc is as follows. A recording layer immediately after being filmed is in an amorphous state and low in reflectivity. Therefore, the recording layer of the optical disc is heated by irradiating a laser beam first, and then whole area of the recording layer is conducted to be a crystalline state that is high in reflectivity. In other words, the optical disc is initialized. Generally, this initialization is conducted by irradiating a laser beam converged with a diameter of some ten to 100 μm on the optical disc that is rotating.

A part of the recording layer is melted by irradiating a laser beam on the initialized optical disc locally, and then cooled down rapidly. A phase of the part of the recording layer results in changing into an amorphous state. Accordingly, optical characteristics such as reflectivity, transmissivity, and birefringence index of the recording layer change in response to the phase change, and information is recorded.

Reproduction is conducted by detecting reflectivity difference between crystal and amorphous or phase difference between them by irradiating a weaker laser beam than that for recording.

Further, rewriting is conducted by overwriting on a pre-recorded record mark without processing through an erasing process by injecting a recording peak power that is superimposed on an erasing power in low energy causing crystallization into the recording layer.

In the case of the GeSbTe system alloy except for the materials practically applied, it is commonly known that an eutectic composition of Sb and Te transforms its crystalline state to amorphous state or vice versa.

The Japanese Patent Application Laid-open Publication Nos. 1-115685/1989, 1-251342/1989, and 1-303643/1989 disclose the range of composition such as adding a third element, particularly, adding Ge into $Sb_{70}Te_{30}$, wherein suffixes $_{70}$ and $_{30}$ represent an atomic ratio.

However, the prior arts disclosed in the above-mentioned Japanese Patent Application Publications could not realize such an optical information recording medium that is adequate to recording and reproducing characteristics and a contrast ratio, and high in durability against reproduction light.

With respect to a recording method of an optical disc that is made from a phase change material, recording has been conducted by using a red laser beam having a wavelength of around 650 nm that has been used for recording DVD-ROM discs, or by using a laser beam having a wavelength longer than 650 nm. Recently, however, a semiconductor laser element emitting light having a wavelength of around 400 nm has been introduced into the market.

Further, a numerical aperture (hereinafter referred to as NA) of an objective lens has been increased, and resulted in enabling to converge a light beam furthermore.

Combining a laser beam having a shorter wavelength and an objective lens having a higher NA to use makes a spot diameter of a laser beam smaller and results in enabling to increase recording density of an optical disc more. Consequently, an optical disc system using a blue laser beam has been studied.

By using such an optical disc system using a blue laser beam, researching in and developing an optical disc, which is excellent in performances superior to those of the conventional optical disc system using a red laser beam, and realizes high density recording, is commonly practiced. It is demanded for such an optical disc to be capable of a blue laser beam having a shorter wavelength and to be able to record sufficiently even by a short pulse width, and further to be able to rewrite.

With respect to GeSbTe system materials in the neighborhood of eutectic composition out of conventional materials, it has been experimentally confirmed that the GeSbTe system materials enabled to be recorded and reproduced to some extent by using an optical disc system equipped with a blue laser beam.

Further, in order to improve recording and reproducing characteristics, it is also experimentally confirmed that a linear velocity corresponding to recording can be changed by controlling a crystallizing speed by adjusting balance of each amount of Sb and Te in compositional elements of the GeSbTe system materials.

Furthermore, an amount of Ge severely affects stability of recording materials. If the amount of Ge is within a moderate range, reproduction durability against a blue laser beam having a small beam diameter and a high energy density can be increased.

However, in order to perform recording in higher density, it is essential to improve recording and reproducing characteristics furthermore. In other words, increasing reproduction power and reducing jitter is essential for recording in higher density. On the contrary, in a case of an optical disc made from GeSbTe system materials as a recording material, there exists a characteristic limit with respect to increasing reproduction power and reducing jitter.

SUMMARY OF THE INVENTION

Accordingly, in consideration of the above-mentioned problems of the prior art, an object of the present invention is to provide an optical information recording medium. The optical information recording medium enables to withstand reproduction light in higher output, which is so high that conventional optical information recording mediums made from recording materials of GeSbTe system material could never withstand, and enables to be record in lower jitter.

In order to achieve the above object, the present invention provides, according to an aspect thereof, an optical information recording medium comprising at least a phase-change type recording layer provided on a substrate, being conducted to record and erase information by changing a phase of the phase-change type recording layer by irradiating light, the phase-change type recording layer further composed of $Ti_wGe_xSb_yTe_z$, wherein each of w, x, y and z is in atomic percent and satisfies following relations: $0.5 \leq w \leq 4.0$, $3.4 \leq x \leq 14.5$, $2.1 \leq y/z \leq 4.0$ and $w+x+y+z=100$.

Other object and further features of the present invention will be apparent from the following detailed description when read in conjunction with the accompanying drawings.

BRIEF DESCRIPTION OF DRAWINGS

FIG. 4 is a table exhibiting durability against reproduction light and initial jitter with respect to recording layer compositions added with Ti to a recording layer of an optical disc according to an embodiment one of the present invention.

FIG. 5 is a table exhibiting durability against reproduction light and initial jitter with respect to recording layer compositions added with Ti to a recording layer of an optical disc according to an embodiment two of the present invention.

FIG. 6 is a table exhibiting durability against reproduction light and initial jitter with respect to recording layer compositions added with Ti to a recording layer of an optical disc according to an embodiment three of the present invention.

FIG. 7 is a table exhibiting durability against reproduction light and initial jitter with respect to recording layer compositions added with Ti to a recording layer of an optical disc according to an embodiment four of the present invention.

FIG. 8 is a table exhibiting durability against reproduction light and initial jitter with respect to recording layer compositions added with Ti to a recording layer of an optical disc according to an embodiment five of the present invention.

FIG. 9 is a table exhibiting durability against reproduction light and initial jitter with respect to recording layer compositions added with Ti to a recording layer of an optical disc according to an embodiment six of the present invention.

FIG. 10 is a table exhibiting durability against reproduction light and initial jitter with respect to recording layer compositions added with Ti to a recording layer of an optical disc according to an embodiment seven of the present invention.

FIG. 11 is a table exhibiting recording power and strategy as recording conditions according to the embodiment of the present invention.

FIG. 12 is a comparison table showing a C/N at each of immediately after and 5 minutes after still mode reproduction is started while changing a reproduction power.

FIG. 13 is a table exhibiting deteriorated reproduction and jitter with respect to the embodiments one to seven of the present invention and a comparative example.

DETAILED DESCRIPTION OF THE PREFERRED EMBODIMENTS

With referring to accompanied drawings, preferred embodiments of an optical information recording medium according to the present invention are described next. Each embodiment mentioned below is a preferable example of the present invention. Therefore, it should be understood that scope of the present invention is not limited to the embodiments mentioned below unless otherwise specified in the specification although various limitations that are technically preferable are given.

In order to understand an optical disc that is one example of an optical information recording medium according to the present invention generally, background of the optical disc is explained first. As it is understood by the Japanese Patent Application Laid-open Publications mentioned above, a laser beam of relatively high output is essential to initialize an optical disc. In such a laser beam of high output, a beam diameter is made finer, so that density of the laser beam increases even in lower laser power. However, it takes extremely long time to initialize an optical disc by scanning with a laser beam having a beam diameter in some micron.

Hence, a GeSbTe system material, which is produced by combining GeTe and $Ge_2Sb_3$, other than eutectic system materials that enable to be initialized by lower power, has been developed. Accordingly, current optical discs for the DVD-RAM system have come into existence. Then, an AgInSbTe system material has been developed shortly after the GeSbTe system material came into existence, and optical discs for a CD-RW disc and a DVD-RW disc have come into existence.

The AgInSbTe system material requires a laser power, which is much stronger than that for the GeSbTe system material used for a RAM disc. Consequently, a laser beam has been advanced to a shorter wavelength and higher output, and an initializing apparatus installed with a laser element in high power has been introduced since the time of developing such a material.

By the appearance of such an initializing apparatus installed with a high power laser element, development of GeSbTe system materials of eutectic system, which were hard to initialize in the past, has been advanced and continued until now.

A preferred embodiment of an optical disc as an optical information recording medium according to the present invention is detailed next.

It should be understood that the present invention is not limited to configurations and materials disclosed hereinafter.

Figure 1:
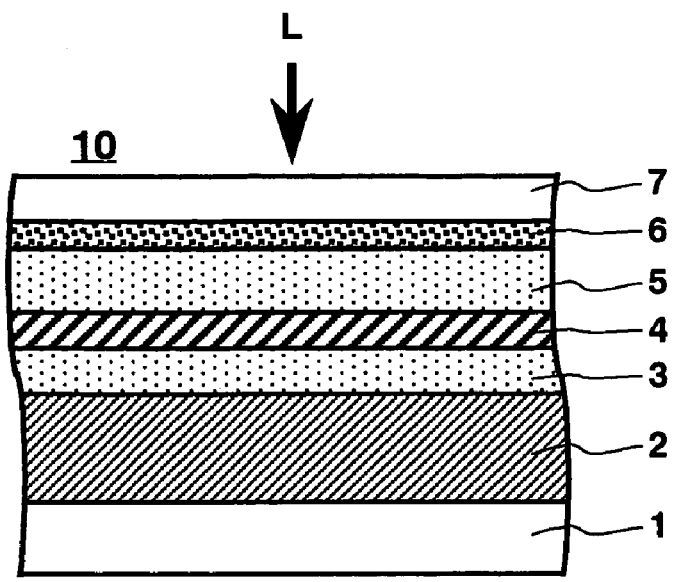
FIG. 1 is a cross sectional view showing a fundamental constitution of an optical information recording medium (optical disc) according to an embodiment of the present invention.
Figure 3:
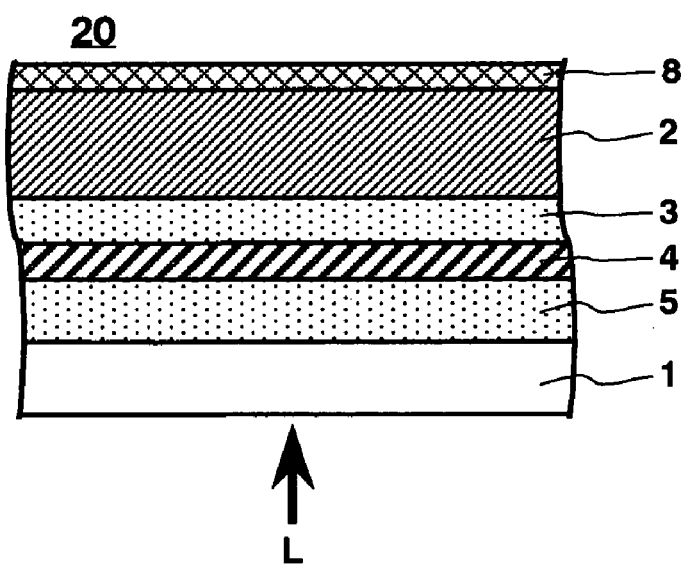
FIG. 3 is a cross sectional view showing a fundamental constitution of an optical information recording medium (optical disc) according to another embodiment of the present invention.
Figure 2:
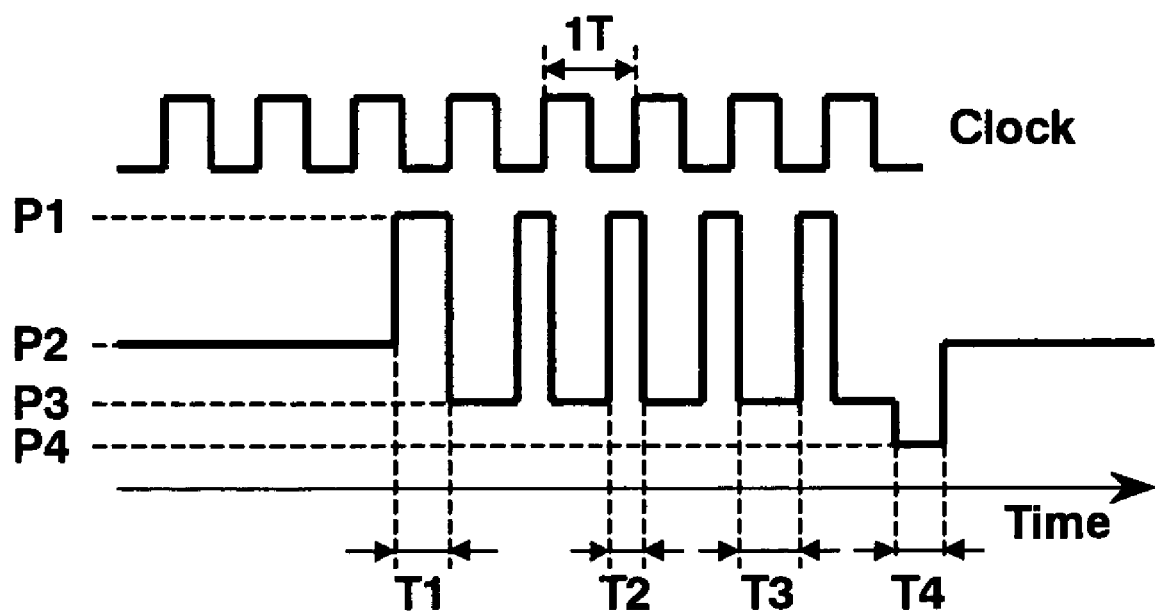
FIG. 2 shows a pattern of recording strategy according to the present invention.

FIG. 1 is a cross sectional view showing a fundamental constitution of an optical information recording medium (optical disc) according to an embodiment of the present invention. FIG. 2 shows a pattern of recording strategy according to the present invention. FIG. 3 is a cross sectional view showing a fundamental constitution of an optical information recording medium (optical disc) according to another embodiment of the present invention. FIG. 4 is a table exhibiting durability against reproduction light and initial jitter with respect to recording layer compositions added with Ti to a recording layer of an optical disc according to an embodiment one of the present invention. FIG. 5 is a table exhibiting durability against reproduction light and initial jitter with respect to recording layer compositions added with Ti to a recording layer of an optical disc according to an embodiment two of the present invention. FIG. 6 is a table exhibiting durability against reproduction light and initial jitter with respect to recording layer compositions added with Ti to a recording layer of an optical disc according to an embodiment three of the present invention. FIG. 7 is a table exhibiting durability against reproduction light and initial jitter with respect to recording layer compositions added with Ti to a recording layer of an optical disc according to an embodiment four of the present invention.

FIG. 8 is a table exhibiting durability against reproduction light and initial jitter with respect to recording layer compositions added with Ti to a recording layer of an optical disc according to an embodiment five of the present invention. FIG. 9 is a table exhibiting durability against reproduction light and initial jitter with respect to recording layer compositions added with Ti to a recording layer of an optical disc according to an embodiment six of the present invention. FIG. 10 is a table exhibiting durability against reproduction light and initial jitter with respect to recording layer compositions added with Ti to a recording layer of an optical disc according to an embodiment seven of the present invention. FIG. 11 is a graph showing a relation between additive amount of Ti and jitter with respect to samples 2-v7 to 17-v7 summarizing contents exhibited in FIGS. 4–10. FIG. 12 is a table showing an amount of Ge in each sample of which recording layer is added with Ti. FIG. 13 is a table showing a ratio of Sb to Te (Sb/Te) in each sample of which recording layer is added with Ti. FIG. 11 is a table exhibiting recording power and strategy as recording conditions according to the embodiment of the present invention. FIG. 12 is a comparison table showing a change of C/N at each of immediately after and 5 minutes after still mode reproduction is started while changing a reproduction power.

In FIG. 1, an optical disc 10 according to an embodiment of the present invention is composed of a substrate 1, a reflective layer 2, a first protective layer 3, a phase-change type recording layer (hereinafter referred to as recording layer) 4, a second protective layer 5, an adhesive layer 6, and a cover sheet layer 7. They are sequentially laminated. The optical disc 10 according to the embodiment of the present invention is provided with the recording layer 4 above the substrate 1. Recording information in or erasing information from the optical disc 10 is conducted by irradiating a laser beam L on the recording layer 4 through the cover sheet layer 7 opposite to the substrate 1 side so as to change configuration of atoms constituting the recording layer 4.

The laser beam L enters into the optical disc 10 through the cover sheet layer 7 hereupon. However, the laser beam L can be entered through the substrate 1 side without providing the cover sheet layer 7. In a case that reflectivity is sufficiently high, a constitution excluding the reflective layer 2 can be applicable.

FIG. 3 is a cross sectional view of an optical disc according to another embodiment of the present invention, wherein a laser beam is irradiated on an opposite side in comparison with the optical disc 10 shown in FIG. 1. In FIG. 3, an optical disc 20 is composed of a substrate 1, a second protective layer 5, a recording layer 4, a first protective layer 3, a reflective layer 2, and a protective coat layer 8. They are sequentially laminated.

With respect to a material for the substrate 1 of the optical discs 10 and 20, any of glass, plastic, and glass provided with light curable resin thereon can be used. However, a plastic is preferable for a substrate in consideration of productivity including cost, particularly polycarbonate resin is most preferable.

A thickness of the recording layer 4 is not specifically defined. However, it is 3 nm to 100 nm. Particularly, it is desirable to be more than 3 nm and less than 30 nm, because such a recording layer is high in recording and erasing sensitivity and enables to record and erase a plurality of times.

Constituting the first and second protective layers 3 and 5 to be a dielectric layer as mentioned above is effective for improving a signal contrast when reproducing due to effects of optical interference and protecting the substrate 1 and the recording layer 4 from heat, that is, preventing the substrate 1 and the recording layer 4 from thermal deformation caused by irradiating the laser beam L when recording, and resulting in deteriorating recording characteristics.

Further, the first and second protective layers 3 and 5 are effective for activating crystallization of the recording layer 4 and improving an erasing ratio. An inorganic thin film of $ZnS$—$SiO_2$, $Si_3N_4$, or $Al_2O_3$ is applicable for the first and second protective layers 3 and 5.

Particularly, a thin film of a metal or an oxide of semiconductor such as Si, Ge, Al, Ti, Zr, and Ta, a thin film of a metal or a nitride of semiconductor such as Si, Ge, and Al, a thin film of a metal or a carbide of semiconductor such as Ti, Zr, Hf and Si, a thin film of a metal or a sulfide of semiconductor such as $ZnS$, $In_2S_3$, $TaS_4$, and $GeS_2$, and a thin film of a film of mixture of more than two compounds listed above is desirable for the first and second protective layers 3 and 5 because it is high in heat resistance and stable chemically.

Furthermore, a material that is less in atomic diffusion is preferable for the first and second protective layers 3 and 5 constituting a protective layer for the recording layer 4. Oxide, sulfide, nitride, or carbide of such a material is not necessary to be stoichiometric composition. However, it is effective for them to use by controlling compositions or by mixing them to control a refractive index.

More, the first and second protective layers 3 and 5, which are made from such a material that is less in atomic diffusion and is mixed with fluoride such as $MgF_3$, is preferable because residual stress of a film or layer is small. Particularly, a mixed film of $ZnS$ and $SiO_2$ is more preferable because recording sensitivity, a C/N (carrier to noise ratio), and an erase ratio is hardly deteriorated even by repeating recording and erasing. A thickness of the first and second protective layers 3 and 5 is 5 nm to 200 nm approximately.

Moreover, a thickness of the first protective layer 3 is desirable to be 5 nm to 30 nm because recording characteristics such as C/N and erase ratio are hardly deteriorated, and rewriting a plurality of times stably is possible. A thickness of the second protective layer 5 is desirable to be 30 nm to 200 nm because the second protective layer 5 is hard to be removed from the recording layer 4 or the adhesive layer 6, and further defect such as clacking seldom occurs. It is also acceptable that the first and second protective layers 3 and 5 can be constituted by different components from each other not by an identical component.

With respect to a material for the reflective layer 2, there exists a metal having light reflectiveness such as Al, Au, and Ag, an alloy composed of any of the metal as a main component with containing an additive element such as Ti, Cr, Pd, and Cu, and a mixture of a metal such as Al, Au, and Ag with a metal compound such as nitride, oxide, and chalcogenide of a metal such as Al and Si. A metal such as Al, Au, and Ag and an alloy containing the metal as a main component is high in light reflectiveness and enables to be made thermal conductivity higher, so that the metal or the alloy is preferable for the reflective layer 2. A thickness of the reflective layer 2 is more than 5 nm and less than 300 nm approximately.

The recording layer 4 that is a feature of the present invention is constituted by $Ti_wGe_xSb_yTe_z$. The suffixes w, x, y, and z are in atomic percent and satisfy following relations respectively.

$0.5 \leq w \leq 4.0$
$3.4 \leq x \leq 14.5$,
$2.1 \leq y/z \leq 4.0$, and
$w+x+y+z=100$.

Further details will be explained later.

With respect to a light source for the optical discs 10 and 20 according to the present invention, the laser beam L is preferably used, wherein a wavelength of the laser beam is within a range of 830 nm in the near infrared region and 300 nm in the ultraviolet region. A laser beam in which a wavelength of primary light is shortened by using a secondary harmonic generating element (SHG element) can also be used as a light source.

With referring to FIG. 2, a recording strategy is explained next. Recording on an optical disc 10 according to the present invention is conducted by forming an amorphous record mark in a recording layer 4 after heating the recording layer 4 by irradiating a laser beam pulse or like on the recording layer 4 in a crystalline state and cooling down rapidly.

Practically, by injecting a recording peak power P1 superimposed on an erasing power P2 in lower energy that induces crystallization into the recording layer 4, a record mark previously recorded is overwritten without passing through an erasing process. At this moment, the recording laser pulse is divided into a plurality of pulses of which length is shorter than that of a record mark.

In this embodiment of the present invention, an optical disc 10 is recorded through the one beam overwrite method by using the Optical Disc Drive Tester: model LM330A manufactured by Shibasoku Co., Ltd. equipped with a laser diode emitting a laser beam having a wavelength of 405 nm and an optical lens or objective lens having a numerical aperture (NA) of 0.85. The Initializer: model LK201A manufactured by Shibasoku. Co., Ltd. is used as an initializing apparatus.

It is experimentally confirmed that a GeSbTe system material in the neighborhood of eutectic composition can be recorded and reproduced to some extent by using a system equipped with a blue laser beam.

Further, it is also experimentally confirmed that a crystallizing speed can be controlled and a corresponding linear velocity when recording can be changed by adjusting a balance of respective amount of Sb and Te out of constituting elements of a GeSbTe system material so as to improve recording and reproducing characteristics.

Furthermore, an amount of Ge severely affects stability of a recording material. It is also experimentally confirmed that reproduction durability against a blue laser beam, which is small in beam diameter and high in energy density, can be increased if an amount of Ge is within a moderate range.

Consequently, 18 samples of optical discs are experimented and 12 samples are extracted, wherein each recording layer 4 of the 18 samples is made from the GeSbTe system material with changing a compositional amount of respective Ge, Sb and Te sample by sample. According to the experiment, an optical disc satisfying conditions such that deterioration in reproduction is less than 2 dB and an initial jitter is less than 9% is supposed to be capable of a next-generation blue laser beam and able to be recorded sufficiently even by a short pulse width and rewritable as far as a compositional amount in atomic percent of GeSbTe and a ratio of Sb/Te is within the moderate range. The extracted 12 samples satisfy the conditions mentioned above. The result of the experiment is summarized in FIG. 13 that will be detailed later.

A description explaining about each embodiment of the present invention and a comparative example is based on the extracted 12 samples. In FIG. 13 (will be detailed later), samples marked with "Yes" in both columns of "deteriorated reproduction" and "jitter" correspond to each optical disc according to embodiments of the present invention.

However, the extracted 12 samples are not satisfactory samples for increasing reproduction power or reducing jitter although the extracted 12 samples are capable of the next-generation blue laser beam and enable to be recorded by a short pulse width sufficiently and are rewritable as mentioned above. In other words, in an optical disc using a GeSbTe system material as a phase-change type recording layer according to a conventional constitution, a durable reproduction power output is the order of 0.36 mW at most, so that enough contrast can not be obtained. Consequently, a C/N is deteriorated and jitter is not reduced, and a recording and reproducing characteristic is essential to be improved furthermore.

According to the present invention, by adding a proper amount of titanium (Ti) into a GeSbTe system material as a phase-change type recording layer in order to solve the above-mentioned problem, an optical disc, which exhibits an excellent recording and reproducing characteristic by a system equipped with a blue laser beam and strong durability against reproduction light in comparison with a conventional recording material made from GeSbTe only, is obtained. Further details are explained next.

Following embodiments are based on the extracted 12 samples, which are capable of the next-generation blue laser beam and enable to be recorded by a shorter pulse width sufficiently and are rewritable as mentioned above. Seven samples are selected out from the extracted 12 samples. By adding Ti to the selected 7 samples, a specific effect that is never achieved by the conventional constitution is detailed one by one.

[Embodiment One]

FIG. 4 is a table exhibiting durability against reproduction light and initial jitter with respect to recording layer compositions added with Ti to a recording layer of an optical disc according to an embodiment one of the present invention.

With referring to FIG. 4, a sample No. 2 is explained first. In FIG. 4, a reference sign "2" in a "Sample No." column denotes a sample No. 2 shown in FIG. 13 that will be detailed later. Reference signs "2-v1" to "2-v7" correspond to states of durable reproduction power and average initial jitter when an amount of Ti is changed with respect to the sample No. 2.

By the sputtering method, an Ag alloy as a reflective layer 2, ZnS—SiO$_2$ as a first protective layer 3, TiGeSbTe as a recording layer 4, and ZnS—SiO$_2$ as a second protective layer 5 are sequentially formed on a polycarbonate substrate 1 having a diameter of 120 mm. Then by using ultraviolet curable resin as an adhesive layer 6, a cover sheet layer 7 is adhered thereon. In this constitution, each film thickness of the reflective layer 2, the first protective layer 3, the recording layer 4, and the second protective layer 5 is 200 nm, 8 nm, 14 nm, and 36 nm respectively.

Further, compositions of the recording layer 4 in atomic percent are set to 0.5% of Ti, 3.4% of Ge, 72.7% of Sb, and 23.4% of Te. Ultraviolet ray is irradiated on the cover sheet layer 7 so as to harden the adhesive layer 6 sufficiently after the cover sheet layer 7 is adhered thereon. Then, the sample No. 2 is initialized by using the Initializer installed with a laser beam having a spot diameter of 120 μm, wherein initializing conditions are such that a linear velocity and a feed pitch is fixed to 4 m/s and 40 µm respectively and a laser output is 570 mW.

The laser output for initializing the sample No. 2 hereupon is equal to that for a comparative example (will be explained later) made from GeSbTe. However, the output is a result of optimizing a laser power for TiGeSbTe. After initialization, an information signal modulated in 1–7 modulation is recorded in a groove of the sample No. 2 at a linear velocity of 5.28 m/s under recording conditions exhibited in a line of "sample No. 2" in FIG. 11 (will be detailed later), wherein recording strategy and recording power shown in FIG. 2 is as follows: P1=5.2 mW, P2=2.7 mW, P3=0.1 mW, P4=0.1 mW, T1=0.4T, T2=0.4T, T3=0.7T, and T4=0.7T, wherein 1T is defined as 15.1 nsec. Then, the recorded signal is reproduced and clock to data jitter is measured by slicing the reproduced signal along a center of amplitude.

FIG. 11 is a table exhibiting recording power and strategy as recording conditions according to each embodiment of the present invention. In FIG. 11, each of reference signs P1 through P4 and T1 through T4 is correspond to that of the recording strategy shown in FIG. 2.

It should be understood that sample Nos. 2, 4, 7, 9, and 15–17 shown in FIG. 11 correspond to sample Nos. according to each embodiment of the present invention.

Jitter is measured by the Time Interval Analyzer: model TA520 manufactured by Yokogawa Electric Corp. Initial jitter after first recording is 7.1% at a front end of a record mark and 6.8% at a rear end of the record mark. An average of both jitter is 6.95% and resulting in being recorded excellently (refer to a column of "2-v1" in FIG. 4). An initial jitter value hereupon is jitter of an optical disc itself. According to the standard for next-generation blue laser, a jitter value including a hardware side is defined as less than 10%. Consequently, an initial jitter value of optical disc alone is desirably suppressed to be at least the order of 7%.

Further, the same optical disc (sample No. 2-v1) is recorded with a single signal having a length of 2T according to the above-mentioned recording strategy. A C/N is measured while a track recorded with the single signal is reproduced in the still reproduction mode. At this moment, each C/N at immediately after and 5 minutes after performing the still reproduction is measured while a reproduction power is changed from 0.30 mW to 0.40 mW by every 0.01 mW. A maximum value of a reproduction power, which satisfies a range of less than 0.2 dB with respect to a difference of C/N between the immediately after and the 5 minutes after the still reproduction is started, is defined as durable reproduction power. Generally, measuring equipment including a spectrum analyzer lead to an error of the order of 0.2 dB with respect to a C/N.

In a case that reproduction light results in deterioration, a change of C/N can be almost confirmed by conducting the still reproduction for a period of the order of one minute. After 5 minutes elapsed, a deteriorated amount of C/N definitely exceeds 0.2 dB and having deteriorated can be confirmed thoroughly. Consequently, a standard for deterioration by reproduction light is defined as 0.2 dB of C/N difference.

According to the above-mentioned measurement, with respect to the optical disc of the embodiment one, each C/N at immediately after and 5 minutes after the still reproduction is started is 50.2 dB and 50.2 dB respectively. A C/N is measured by a spectrum analyzer and is the average of 16 data. In the optical disc of the embodiment one, there is no difference between the C/N at "immediately after" and the C/N at "5 minutes after". In other words, it is understood that the optical disc offers a stable performance without deteriorated reproduction.

Reproduction light is explained here. A mark of which jitter is worst of all marks to be recorded is a 2T mark as a shortest mark that is hard to be recorded. The reason why the shortest mark is hard to be recorded is that an irradiation time of laser when recording, that is, a mark forming time is shortest, so that it takes longer time to form a mark. In other words, if jitter of the 2T mark is reduced to less than 9%, jitter of all marks can surely be reduced to less than 9%, and resulting in reducing synthesized jitter extremely. It is experimentally known that a necessary C/N for reducing the jitter of the 2T mark alone to 9% is 51.0 dB.

In a case that a phase-change type recording layer is made from GeSbTe excluding Ti hereupon, a C/N becomes 50.0 dB when reproduced by a power of 0.3 mW that is a reproduction power being supposed not to deteriorate reproduction. It is confirmed experimentally that a C/N is confined to 50.0 dB and will not reach to 51.0 dB although the reproduction light is increased up to 0.36 mW as high as the maximum durable power.

On the other hand, in a case of the optical disc according to the embodiment one of the present invention of which phase-change type recording layer is made from GeSbTe containing Ti, a durable reproduction power is 0.38 mW to 0.40 mW. As it will be mentioned later, the relatively higher durable reproduction power is caused by that Ti is the element having higher melting point and is thermally stable extremely and will not react against Ge, Sb and Te constituting a phase-change type recording layer and is a stable substance, which will not react against materials constituting an adjoining protective layer. By adding an appropriate amount of Ti, the added Ti functions as an anchor in the recording layer and makes a mark edge sharper when forming a record mark, and resulting in reducing jitter.

Further, as mentioned above, Ti is such a substance that have higher melting point, so that Ti is excellent in thermal durability. Consequently, the phase-change type recording layer made from GeSbTe containing Ti is supposed to be able to withstand a stronger power with respect to reproduction light.

Furthermore, in a case that the optical disc is reproduced by a power of 0.30 mW, which is supposed not to deteriorate reproduction, a C/N is 50.2 dB maximum. However, the C/N is able to increase up to 51.1 dB by increasing the reproduction power up to 0.38 mW. In other words, jitter of a 2T mark alone can be suppressed to 9% even when forming the 2T mark as a shortest mark that is hard to be recorded.

In this connection, when the reproduction power is increased up to 0.38 mW, a C/N at immediately after a still reproduction is started is 51.1 dB and a C/N at 5 minutes after the still reproduction is started is 51.1 dB. In other words, the C/N value sufficiently satisfies the above-mentioned C/N condition necessary for the jitter of the 2T mark alone to be 9% as shown in a line of sample No. "2-v1 to 2-v5" in FIG. 12.

FIG. 12 hereupon is a comparison table showing a C/N at each of immediately after and 5 minutes after still mode reproduction is started with respect to each sample. The table further exhibits a C/N at each reproduction power of 0.3 mW and 0.38 mW.

An optical disc in which an amount of Ge and value of Sb/Te are set to the same as those of the sample No. 2 and each amount of Sb and Te is slightly changed from those of the sample No. 2 and an amount of Ti is set to 1.0 is experimented as a sample No. "2-v2". According to the experiment, satisfactory results are obtained such that a durable reproduction power is 0.38 mW and average initial jitter is 6.89%. In other words, it is understood that the optical disc of the sample No. "2-v2" satisfies the standard for the next generation in reproduction power output and initial jitter.

An optical disc in which an amount of Ge and value of Sb/Te are set to the same as those of the sample No. 2 and each amount of Sb and Te is slightly changed from those of the sample No. 2 and an amount of Ti is set to 2.0 is experimented as a sample No. "2-v3". According to the experiment, satisfactory results are obtained such that a durable reproduction power is 0.38 mW and average initial jitter is 6.97%. In other words, it is understood that the optical disc of the sample No. "2-v3" satisfies the standard for the next generation in reproduction power output and initial jitter.

An optical disc in which an amount of Ge and value of Sb/Te are set to the same as those of the sample No. 2 and each amount of Sb and Te is slightly changed from those of the sample No. 2 and an amount of Ti is set to 3.0 is experimented as a sample No. "2-v4". According to the experiment, satisfactory results are obtained such that a durable reproduction power is 0.38 mW and average initial jitter is 7.11%. In other words, it is understood that the optical disc of the sample No. "2-v4" satisfies the standard for the next generation in reproduction power output and initial jitter.

An optical disc in which an amount of Ge and value of Sb/Te are set to the same as those of the sample No. 2 and each amount of Sb and Te is slightly changed from those of the sample No. 2 and an amount of Ti is set to 4.0 is experimented as a sample No. "2-v5". According to the experiment, satisfactory results are obtained such that a durable reproduction power is 0.38 mW and average initial jitter is 7.58%. In other words, it is understood that the optical disc of the sample No. "2-v5" satisfies the standard for the next generation in reproduction power output and initial jitter.

An optical disc in which an amount of Ge and value of Sb/Te are set to the same as those of the sample No. 2 and each amount of Sb and Te is slightly changed from those of the sample No. 2 and an amount of Ti is set to 5.0 is experimented as a sample No. "2-v6". According to the experiment, a durable reproduction power is 0.38 mW and average initial jitter is 8.87%. The result is inferior to that of the sample No. 2. In other words, it is understood that the optical disc of the sample No. "2-v6" does not satisfy the standard for the next generation in reproduction power output and initial jitter.

An optical disc in which an amount of Ge and value of Sb/Te are set to the same as those of the sample No. 2 and each amount of Sb and Te is slightly changed from those of the sample No. 2 and an amount of Ti is set to 6.0 is experimented as a sample No. "2-v7". According to the experiment, a durable reproduction power is 0.38 mW and average initial jitter is 9.92%. The result is inferior to that of the sample No. "2-v6". In other words, it is understood that the optical disc of the sample No. "2-v7" does not satisfy the standard for the next generation in reproduction power output and initial jitter.

Since an error of the order of 0.2 dB occurs hereupon as a measurement error, it is assumed to be excellent that a change of C/N immediately after reproduction is started is less than 0.2 dB. In other words, less than 0.2 dB of a C/N change between immediately after and 5 minutes after reproduction is started is equivalent to no change substantially. Strength of a reproduction power is examined with respect to a C/N after 5 minutes elapsed of which deterioration caused by the reproduction power is less than 0.2 dB. By the examination, it is found that a C/N after 5 minutes elapsed enables to withstand against up to 0.38 mW of the reproduction power. Consequently, it is understood that the optical disc 10 according to the embodiment one offers excellent durability against reproduction light and is one of optical discs satisfying the standard for the next generation.

Further, according to results of the sample. Nos. "2-v1" through "2-v7", it is understood that an amount of Ti within a range of 0.5 to 4.0 results in offering excellent initial jitter.

[Embodiment Two]

FIG. 5 is a table exhibiting durability against reproduction light and initial jitter with respect to recording layer compositions added with Ti to a recording layer of an optical disc according to an embodiment two of the present invention.

With referring to FIG. 5, an optical disc of sample No. 4 is explained next. In FIG. 5, a reference sign "4" in a "Sample No." column denotes a sample No. 4 shown in FIG. 13 that will be detailed later. Reference signs "4-v1" to "4-v7" correspond to states of durable reproduction power and average initial jitter when an amount of Ti is changed with respect to the sample No. 4.

By the sputtering method, a reflective layer 2, a first protective layer 3, a recording layer 4 and a second protective layer 5 are sequentially formed on a polycarbonate substrate 1 having a diameter of 120 mm. Then by using ultraviolet curable resin as an adhesive layer 6, a cover sheet layer 7 is adhered thereon. In this constitution, each film thickness of the reflective layer 2, the first protective layer 3, the recording layer 4, and the second protective layer 5 is 200 nm, 8 nm, 14 nm, and 36 nm respectively.

Further, compositions of the recording layer 4 in atomic percent are set to 0.5% of Ti, 4.3% of Ge, 64.5% of Sb, and 30.7% of Te. Ultraviolet ray is irradiated on the cover sheet layer 7 so as to harden the adhesive layer 6 sufficiently after the cover sheet layer 7 is adhered. Then, the sample No. 4 is initialized by using the Initializer installed with a laser beam having a spot diameter of 120 µm, wherein initializing conditions are such that a linear velocity and a feed pitch is fixed to 4 m/s and 40 µm respectively and a laser output is 570 mW.

The laser output for initializing the sample No. 4 hereupon is equal to that for a comparative example (will be explained later) made from GeSbTe. However, the output is a result of optimizing a laser power for TiGeSbTe. After initialization, an information signal modulated in 1–7 modulation is recorded in a groove of the sample No. 4 at a linear velocity of 5.28 m/s under recording conditions exhibited in a line of "sample No. 4" in FIG. 11, wherein recording strategy and recording power shown in FIG. 2 is as follows: P1=5.2 mW, P2=2.7 mW, P3=0.1 mW, P4=0.1 mW, T1=0.4T, T2=0.4T, T3=0.7T, and T4=0.7T, wherein 1T is defined as 15.1 nsec. Then, the recorded signal is reproduced and clock to data jitter is measured by slicing the reproduced signal along a center of amplitude.

Jitter is measured by the Time Interval Analyzer: model TA520 manufactured by Yokogawa Electric Corp. Initial jitter after first recording is 7.54% at a front end of a record mark and 7.42% at a rear end of the record mark. An average of both jitter is 7.48% and resulting in being recorded excellently (refer to a column of "4-v1" in FIG. 5).

Further, the same optical disc (sample No. 4-v1) is recorded with a single signal having a length of 2T according to the above-mentioned recording strategy. A C/N is measured while a track recorded with the single signal is reproduced in the still reproduction mode. At this moment, each C/N at immediately after and 5 minutes after performing the still reproduction is measured while a reproduction power is changed from 0.30 mW to 0.40 mW. Each C/N at immediately after and 5 minutes after the still reproduction is started is 50.1 dB and 50.1 dB respectively. A C/N is measured by a spectrum analyzer and is the average of 16 data.

In a case that the reproduction power is increased up to 0.38 mW, each C/N at immediately after and 5 minutes after the still reproduction is started is 51.1 dB and 51.1 dB respectively. In other words, the optical disc of the sample No. 4-v1 sufficiently satisfies a C/N condition that is necessary for jitter of the single signal having the length of 2T alone to be 9% (refer to a line of sample No. "4-v1 to 4-v5" in FIG. 12).

As mentioned above, there is no difference between the C/N at "immediately after" and the C/N at "5 minutes after". In other words, it is understood that the optical disc has a stable performance without deteriorating reproduction.

An optical disc in which an amount of Ge and value of Sb/Te are set to the same as those of the sample No. 4 and each amount of Sb and Te is slightly changed from those of the sample No. 4 and an amount of Ti is set to 1.0 is experimented as a sample No. "4-v2". According to the experiment, satisfactory results are obtained such that a durable reproduction power is 0.38 mW and average initial jitter is 7.14%. In other words, it is understood that the optical disc of the sample No. "4-v2" satisfies the standard for the next generation in reproduction power output and initial jitter.

An optical disc in which an amount of Ge and value of Sb/Te are set to the same as those of the sample No. 4 and each amount of Sb and Te is slightly changed from those of the sample No. 4 and an amount of Ti is set to 2.0 is experimented as a sample No. "4-v3". According to the experiment, satisfactory results are obtained such that a durable reproduction power is 0.38 mW and average initial jitter is 7.08%. In other words, it is understood that the optical disc of the sample No. "4-v3" satisfies the standard for the next generation in reproduction power output and initial jitter.

An optical disc in which an amount of Ge and value of Sb/Te are set to the same as those of the sample No. 4 and each amount of Sb and Te is slightly changed from those of the sample No. 4 and an amount of Ti is set to 3.0 is experimented as a sample No. "4-v4". According to the experiment, satisfactory results are obtained such that a durable reproduction power is 0.38 mW and average initial jitter is 7.22%. In other words, it is understood that the optical disc of the sample No. "4-v4" satisfies the standard for the next generation in reproduction power output and initial jitter.

An optical disc in which an amount of Ge and value of Sb/Te are set to the same as those of the sample No. 4 and each amount of Sb and Te is slightly changed from those of the sample No. 4 and an amount of Ti is set to 4.0 is experimented as a sample No. "4-v5". According to the experiment, satisfactory results are obtained such that a durable reproduction power is 0.38 mW and average initial jitter is 7.76%. In other words, it is understood that the optical disc of the sample No. "4-v5" satisfies the standard for the next generation in reproduction power output and initial jitter.

An optical disc in which an amount of Ge and value of Sb/Te are set to the same as those of the sample No. 4 and each amount of Sb and Te is slightly changed from those of the sample No. 4 and an amount of Ti is set to 5.0 is experimented as a sample No. "4-v6". According to the experiment, a durable reproduction power is 0.38 mW and average initial jitter is 9.04%. The result is inferior to that of the sample No. 4. In other words, it is understood that the optical disc of the sample No. "4-v6" does not satisfy the standard for the next generation in reproduction power output and initial jitter.

An optical disc in which an amount of Ge and value of Sb/Te are set to the same as those of the sample No. 4 and each amount of Sb and Te is slightly changed from those of the sample No. 4 and an amount of Ti is set to 6.0 is experimented as a sample No. "4-v7". According to the experiment, a durable reproduction-power is 0.38 mW and average initial jitter is 10.12%. The result is inferior to that of the sample No. "4-v6". In other words, it is understood that the optical disc of sample No. "4-v7" does not satisfy the standard for the next generation in reproduction power output and initial jitter.

Since an error of the order of 0.2 dB occurs hereupon as a measurement error, it is assumed to be excellent that a change of C/N immediately after reproduction is started is less than 0.2 dB. Strength of a reproduction power is examined with respect to a C/N after 5 minutes elapsed of which deterioration caused by the reproduction power is less than 0.2 dB. By the examination, it is found that a C/N after 5 minutes elapsed enables to stand against up to 0.38 mW of the reproduction power. Consequently, it is understood that the optical disc 10 according to the embodiment two offers excellent durability for reproduction light and is one of optical discs satisfying the standard for the next generation.

Further, according to results of the sample Nos. "4-v1" through "4-v7", it is understood that an amount of Ti within a range of 0.5 to 4.0 results in offering excellent initial jitter.

[Embodiment Three]

FIG. 6 is a table exhibiting durability against reproduction light and initial jitter with respect to recording layer compositions added with Ti to a recording layer of an optical disc according to an embodiment three of the present invention.

With referring to FIG. 6, an optical disc of sample No. 7 is explained next. In FIG. 6, a reference sign "7" in a "Sample No." column denotes a sample No. 7 shown in FIG. 13 that will be detailed later. Reference signs "7-v1" to "7-v7" correspond to states of durable reproduction power and average initial jitter when an amount of Ti is changed with respect to the sample No. 7.

By the sputtering method, a reflective layer 2, a first protective layer 3, a recording layer 4 and a second protective layer 5 are sequentially formed on a polycarbonate substrate 1 having a diameter of 120 mm. Then by using ultraviolet curable resin as an adhesive layer 6, a cover sheet layer 7 is adhered thereon. In this constitution, each film thickness of the reflective layer 2, the first protective layer 3, the recording layer 4, and the second protective layer 5 is 200 nm, 8 nm, 14 nm, and 36 nm respectively.

Further, compositions of the recording layer 4 in atomic percent are set to 0.5;% of Ti, 4.6% of Ge, 75.9% of Sb, and 19.0% of Te. Ultraviolet ray is irradiated on the cover sheet layer 7 so as to harden the adhesive layer 6 sufficiently after the cover sheet layer 7 is adhered. Then, the sample No. 7 is initialized by using the Initializer installed with a laser beam having a spot diameter of 120 μm, wherein initializing conditions are such that a linear velocity and a feed pitch is fixed to 4 m/s and 40 μm respectively and a laser output is 570 mW.

The laser output for initializing the sample No. 7 hereupon is equal to that for a comparative example (will be explained later) made from GeSbTe. However, the output is a result of optimizing a laser power for TiGeSbTe. After initialization, an information signal modulated in 1–7 modulation is recorded in a groove of the sample No. 7 under recording conditions exhibited in a line of "sample No. 7" in FIG. 11, wherein recording strategy and recording power shown in FIG. 2 is as follows: P1=5.2 mW, P2=3.4 mW, P3=0.1 mW, P4=0.1 mW, T1=0.5T, T2=0.5T, T3=0.8T, and T4=0.8T, wherein 1T is defined as 15.1 nsec. Then, the recorded signal is reproduced and clock to data jitter is measured by slicing the reproduced signal along a center of amplitude.

Jitter is measured by the Time Interval Analyzer: model TA520 manufactured by Yokogawa Electric Corp. Initial jitter after first recording is 7.44% at a front end of a record mark and 7.40% at a rear end of the record mark. An average of both jitter is 7.42% and resulting in being recorded excellently (refer to a column of "7-v1" in FIG. 6).

Further, the same optical disc (sample No. 7-v1) is recorded with a single signal having a length of 2T according to the above-mentioned recording strategy. A C/N is measured while a track recorded with the single signal is reproduced in the still reproduction mode. At this moment, each C/N at immediately after and 5 minutes after performing the still reproduction is measured while a reproduction power is changed from 0.30 mW to 0.40 mW. Each C/N at immediately after and 5 minutes after the still reproduction is started is 50.2 dB and 50.2 dB respectively. A C/N is measured by a spectrum analyzer and is the average of 16 data.

In a case that the reproduction power is increased up to 0.38 mW, each C/N at immediately after and 5 minutes after the still reproduction is started is 51.2 dB and 51.2 dB respectively. In other words, the optical disc of the sample No. 7 sufficiently satisfies a C/N condition that is necessary for jitter of the single signal having the length of 2T alone to be 9% (refer to a line of sample No. "7-v1 to 7-v5" in FIG. 12).

As mentioned above, in the optical disc according to the embodiment three, there is no difference between the C/N at "immediately after" and the C/N at "5 minutes after". In other words, it is understood that the optical disc offers a stable performance without deteriorating reproduction.

An optical disc in which an amount of Ge and value of Sb/Te are set to the same as those of the sample No. 7 and each amount of Sb and Te is slightly changed from those of the sample No. 7 and an amount of Ti is set to 1.0 is experimented as a sample No. "7-v2". According to the experiment, satisfactory results are obtained such that a durable reproduction power is 0.38 mW and average initial jitter is 7.02%. The average initial jitter is superior to that of the sample No. "7-v1". In other words, it is understood that the optical disc of the sample No. "7-v2" satisfies the standard for the next generation in reproduction power output and initial jitter.

An optical disc in which an amount of Ge and value of Sb/Te are set to the same as those of the sample No. 7 and each amount of Sb and Te is slightly changed from those of the sample No. 7 and an amount of Ti is set to 2.0 is experimented as a sample No. "7-v3". According to the experiment, satisfactory results that are superior to the sample No. "7-v2" furthermore are obtained such that a durable reproduction power is 0.38 mW and average initial jitter is 6.82%. In other words, it is understood that the optical disc of the sample No. "7-v3" satisfies the standard for the next generation in reproduction power output and initial jitter.

An optical disc in which an amount of Ge and value of Sb/Te are set to the same as those of the sample No. 7 and each amount of Sb and Te is slightly changed from those of the sample No. 7 and an amount of Ti is set to 3.0 is experimented as a sample No. "7-v4". According to the experiment, satisfactory results are obtained such that a durable reproduction power is 0.38 mW and average initial jitter is 6.98%. In other words, it is understood that the optical disc of the sample No. "7-v4" satisfies the standard for the next generation in reproduction power output and initial jitter.

An optical disc in which an amount of Ge and value of Sb/Te are set to the same as those of the sample No. 7 and each amount of Sb and Te is slightly changed from those of the sample No. 7 and an amount of Ti is set to 4.0 is experimented as a sample No. "7-v5". According to the experiment, satisfactory results are obtained such that a durable reproduction power is 0.38 mW and average initial jitter is 7.36%. In other words, it is understood that the optical disc of the sample No. "7-v5" satisfies the standard for the next generation in reproduction power output and initial jitter.

An optical disc in which an amount of Ge and value of Sb/Te are set to the same as those of the sample No. 7 and each amount of Sb and Te is slightly changed from those of the sample No. 7 and an amount of Ti is set to 5.0 is experimented as a sample No. "7-v6". According to the experiment, a durable reproduction power is 0.38 mW and average initial jitter is 8.51%. The results are almost equivalent to those of the sample No. 7. In other words, it is understood that the optical disc of the sample No. "7-v6" does not satisfy the standard for the next generation in reproduction power output and initial jitter.

An optical disc in which an amount of Ge and value of Sb/Te are set to the same as those of the sample No. 7 and each amount of Sb and Te is slightly changed from those of the sample No. 7 and an amount of Ti is set to 6.0 is experimented as a sample No. "7-v7". According to the experiment, a durable reproduction power is 0.38 mW and average initial jitter is 9.63%. The results are inferior to those of the sample No. "7-v6" furthermore. In other words, it is understood that the optical disc of the sample No. "7-v7" does not satisfy the standard for the next generation in reproduction power output and initial jitter.

Since an error of the order of 0.2 dB occurs hereupon as a measurement error, it is assumed to be excellent that a change of C/N immediately after reproduction is started is less than 0.2 dB. Strength of a reproduction power is examined with respect to a C/N after 5 minutes elapsed of which deterioration caused by the reproduction power is less than 0.2 dB. By the examination, it is found that a C/N after 5 minutes elapsed enables to stand against up to 0.38 mW of the reproduction power. Consequently, it is understood that the optical disc 10 according to the embodiment three offers excellent durability against reproduction light and is one of optical discs satisfying the standard for the next generation.

Further, according to results of the sample Nos. "7-v1" through "7-v7", it is understood that an amount of Ti within a range of 0.5 to 4.0 results in offering excellent initial jitter.

[Embodiment Four]

FIG. 7 is a table exhibiting durability against reproduction light and initial jitter with respect to recording layer compositions added with Ti to a recording layer of an optical disc according to an embodiment four of the present invention.

With referring to FIG. 7, an optical disc of sample No. 9 is explained next. In FIG. 7, a reference sign "9" in a "Sample No." column denotes a sample No. 9 shown in FIG. 13 that will be detailed later. Reference signs "9-v1" to "9-v7" correspond to states of durable reproduction power and average initial jitter when an amount of Ti is changed with respect to the sample No. 9.

By the sputtering method, a reflective layer 2, a first protective layer 3, a recording layer 4 and a second protective layer 5 are sequentially formed on a polycarbonate substrate 1 having a diameter of 120 mm. Then by using ultraviolet curable resin as an adhesive layer 6, a cover sheet layer 7 is adhered thereon. In this constitution, each film thickness of the reflective layer 2, the first protective layer 3, the recording layer 4, and the second protective layer 5 is 200 nm, 8 nm, 14 nm, and 36 nm respectively.

Further, compositions of the recording layer 4 in atomic percent are set to 0.5% of Ti, 6.2% of Ge, 68.7% of Sb, and 24.6% of Te. Ultraviolet ray is irradiated on the cover sheet layer 7 so as to harden the adhesive layer. 6 sufficiently after the cover sheet layer 7 is adhered. Then, the sample No. 9 is initialized by using the Initializer installed with a laser beam having a spot diameter of 120 μm, wherein initializing conditions are such that a linear velocity and a feed pitch is fixed to 4 m/s and 40 μm respectively and a laser output is 570 mW.

The laser output for initializing the sample No. 9 hereupon is equal to that for a comparative example (will be explained later) made from GeSbTe. However, the output is a result of optimizing a laser power for TiGeSbTe. After initialization, an information signal modulated in 1–7 modulation is recorded in a groove of the sample No. 9 at a linear velocity of 5.28 m/s under recording conditions exhibited in a line of "sample No. 9" in FIG. 11, wherein recording strategy and recording power shown in FIG. 2 is as follows: P1=5.2 mW, P2=2.7 mW, P3=0.1 mW, P4=0.1 mW, T1=0.4T, T2=0.4T, T3=0.7T, and T4=0.7T, wherein 1T is defined as 15.1 nsec. Then, the recorded signal is reproduced and clock to data jitter is measured by slicing the reproduced signal along a center of amplitude.

Jitter is measured by the Time Interval Analyzer: model TA520 manufactured by Yokogawa Electric Corp. Initial jitter after first recording is 6.98% at a front end of a record mark and 6.84% at a rear end of the record mark. An average of both jitter is 6.91% and resulting in being recorded excellently (refer to a column of "9-v1" in FIG. 7).

Further, the same optical disc (sample No. 9-v1) is recorded with a single signal having a length of 2T according to the above-mentioned recording strategy. A C/N is measured while a track recorded with the single signal is reproduced in the still reproduction mode. At this moment, each C/N at immediately after and 5 minutes after performing the still reproduction is measured while a reproduction power is changed from 0.30 mW to 0.40 mW. Each C/N at immediately after and 5 minutes after the still reproduction is started is 50.3 dB and 50.2 dB respectively. A C/N is measured by a spectrum analyzer and is the average of 16 data.

In a case that the reproduction power is increased up to 0.38 mW, each C/N at immediately after and 5 minutes after the still reproduction is started is 51.3 dB and 51.2 dB respectively. In other words, the optical disc of the sample No. 9 sufficiently satisfies a C/N condition that is necessary for jitter of the single signal having the length of 2T alone to be 9% (refer to a line of sample No. "9-v1 to 9-v5" in FIG. 12).

As mentioned above, there is no difference between the C/N at "immediately after" and the C/N at "5 minutes after". In other words, it is understood that the optical disc offers a stable performance without deteriorating reproduction.

An optical disc in which an amount of Ge and value of Sb/Te are set to the same as those of the sample No. 9 and each amount of Sb and Te is slightly changed from those of the sample No. 9 and an amount of Ti is set to 1.0 is experimented as a sample No. "9-v2". According to the experiment, satisfactory results are obtained such that a durable reproduction power is 0.39 mW and average initial jitter is 6.78%. The average initial jitter is superior to that of the sample No. 9-v1. In other words, it is understood that the optical disc of the sample No. "9-v2" satisfies the standard for the next generation in reproduction power output and initial jitter.

An optical disc in which an amount of Ge and value of Sb/Te are set to the same as those of the sample No. 9 and each amount of Sb and Te is slightly changed from those of the sample No. 9 and an amount of Ti is set to 2.0 is experimented as a sample No. "9-v3". According to the experiment, satisfactory results are obtained such that a durable reproduction power is 0.39 mW and average initial jitter is 6.65%. The average initial jitter is superior to the sample No. 9-v2 furthermore. In other words, it is understood that the optical disc of the sample No. "9-v3" satisfies the standard for the next generation in reproduction power output and initial jitter.

An optical disc in which an amount of Ge and value of Sb/Te are set to the same as those of the sample No. 9 and each amount of Sb and Te is slightly changed from those of the sample No. 9 and an amount of Ti is set to 3.0 is experimented as a sample No. "9-v4". According to the experiment, satisfactory results are obtained such that a durable reproduction power is 0.39 mW and average initial jitter is 6.84%. In other words, it is understood that the optical disc of the sample No. "9-v4" satisfies the standard for the next generation in reproduction power output and initial jitter.

An optical disc in which an amount of Ge and value of Sb/Te are set to the same as those of the sample No. 9 and each amount of Sb and Te is slightly changed from those of the sample No. 9 and an amount of Ti is set to 4.0 is experimented as a sample No. "9-v5". According to the experiment, satisfactory results are obtained such that a durable reproduction power is 0.39 mW and average initial jitter is 7.09%. In other words, it is understood that the optical disc of the sample No. "9-v5" satisfies the standard for the next generation in reproduction power output and initial jitter.

An optical disc in which an amount of Ge and value of Sb/Te are set to the same as those of the sample No. 9 and each amount of Sb and Te is slightly changed from those of the sample No. 9 and an amount of Ti is set to 5.0 is experimented as a sample No. "9-v6". According to the experiment, a durable reproduction power is 0.39 mW and average initial jitter is 8.25%. The results are inferior to those of the sample No. 9. In other words, it is understood that the optical disc of the sample No. "9-v6" does not satisfy the standard for the next generation in reproduction power output and initial jitter.

An optical disc in which an amount of Ge and value of Sb/Te are set to the same as those of the sample No. 9 and each amount of Sb and Te is slightly changed from those of the sample No. 9 and an amount of Ti is set to 6.0 is experimented as a sample No. "9-v7". According to the experiment, a durable reproduction power is 0.39 mW and average initial jitter is 9.32%. The results are inferior to those of the sample No. "9-v6" furthermore. In other words, it is understood that the optical disc of the sample No. "9-v7" does not satisfy the standard for the next generation in reproduction power output and initial jitter.

Since an error of the order of 0.2 dB occurs hereupon as a measurement error, it is assumed to be excellent that a change of C/N immediately after reproduction is started is less than 0.2 dB. Strength of a reproduction power is examined with respect to a C/N after 5 minutes elapsed of which deterioration caused by the reproduction power is less than 0.2 dB. By the examination, it is found that a C/N after 5 minutes elapsed enables to stand against up to 0.39 mW of the reproduction power. Consequently, it is understood that the optical disc 10 according to the embodiment four offers excellent durability for reproduction light and is one of optical discs satisfying the standard for the next generation.

Further, according to results of the sample Nos. "9-v1" through "9-v7", it is understood that an amount of Ti within a range of 0.5 to 4.0 results in offering excellent initial jitter.

[Embodiment Five]

FIG. 8 is a table exhibiting durability against reproduction light and initial jitter with respect to recording layer compositions added with Ti to a recording layer of an optical disc according to an embodiment five of the present invention.

With referring to FIG. 8, an optical disc of sample No. 15 is explained next. In FIG. 8, a reference sign "15" in a "Sample No." column denotes a sample No. 15 shown in FIG. 13 that will be detailed later. Reference signs "15-v1" to "15-v7" correspond to states of durable reproduction power and average initial jitter when an amount of Ti is changed with respect to the sample No. 15.

By the sputtering method, a reflective layer 2, a first protective layer 3, a recording layer 4, and a second protective layer 5 are sequentially formed on a polycarbonate substrate 1 having a diameter of 120 mm through the similar method to that of the embodiment one. Then by using ultraviolet curable resin as an adhesive layer 6, a cover sheet layer 7 is adhered thereon. In this constitution, each film thickness of the reflective layer 2, the first protective layer 3, the recording layer 4, and the second protective layer 5 is 200 nm, 8 nm, 14 nm, and 36 nm respectively.

Further, compositions of the recording layer 4 in atomic percent are set to 0.5% of Ti, 8.7% of Ge, 69.2% of Sb, and 21.6% of Te. Ultraviolet ray is irradiated on the cover sheet layer 7 so as to harden the adhesive layer 6 sufficiently after the cover sheet layer 7 is adhered. Then, the sample No. 15 is initialized by using the Initializer installed with a laser beam having a spot diameter of 120 µm, wherein initializing conditions are such that a linear velocity and a feed pitch is fixed to 0.4 m/s and 40 µm respectively and a laser output is 570 mW.

The laser output for initializing the sample No. 15 hereupon is equal to that for a comparative example (will be explained later) made from GeSbTe. However, the output is a result of optimizing a laser power for TiGeSbTe. After initialization, an information signal modulated in 1–7 modulation is recorded in a groove of the sample No. 15 at a linear velocity of 5.28 m/s under recording conditions exhibited in a line of "sample No. 15" in FIG. 11, wherein recording strategy and recording power shown in FIG. 2 is as follows: P1=5.2 mW, P2=2.7 mW, P3=0.1 mW, P4=0.1 mW, T1=0.4T, T2=0.4T, T3=0.7T, and T4=0.7T, wherein 1T is defined as 15.1 nsec. Then, the recorded signal is reproduced and clock to data jitter is measured by slicing the reproduced signal along a center of amplitude.

Jitter is measured by the Time Interval Analyzer: model TA520 manufactured by Yokogawa Electric Corp. Initial jitter after first recording is 6.78% at a front end of a record mark and 6.64% at a rear end of the record mark. An average of both jitter is 6.71% and resulting in being recorded excellently (refer to a column of "15-v1" in FIG. 8).

Further, the same optical disc (sample No. 15-v1) is recorded with a single signal having a length of 2T according to the above-mentioned recording strategy. A C/N is measured while a track recorded with the single signal is reproduced in the still reproduction mode. At this moment, each C/N at immediately after and 5 minutes after performing the still reproduction is measured while a reproduction power is changed from 0.0.30 mW to 0.40 mW. Each C/N at immediately after and 5 minutes after the still reproduction is started is 50.4 dB and 50.4 dB respectively. A C/N is measured by a spectrum analyzer and is the average of 16 data.

In a case that the reproduction power is increased up to 0.38 mW, each C/N at immediately after and 5 minutes after the still reproduction is started is 51.4 dB and 51.4 dB respectively. In other words, the optical disc of the sample No. 15 sufficiently satisfies a C/N condition that is necessary for jitter of the single signal having the length of 2T alone to be 9% (refer to a line of sample No. "15-v1 to 15-v5" in FIG. 12).

As mentioned above, in the optical disc according to the embodiment five, there is no difference between the C/N at "immediately after" and the C/N at "5 minutes after". In other words, it is understood that the optical disc of the embodiment five offers a stable performance without deteriorating reproduction.

An optical disc in which an amount of Ge and value of Sb/Te are set to the same as those of the sample No. 15 and each amount of Sb and Te is slightly changed from those of the sample No. 15 and an amount of Ti is set to 1.0 is experimented as a sample No. "15-v2". According to the experiment, satisfactory results are obtained such that a durable reproduction power is 0.39 mW and average initial jitter is 6.63% being almost equivalent to that of the sample No. 15-v1. In other words, it is understood that the optical disc of the sample No. "15-v2" satisfies the standard for the next generation in reproduction power output and initial jitter.

An optical disc in which an amount of Ge and value of Sb/Te are set to the same as those of the sample No. 15 and each amount of Sb and Te is slightly changed from those of the sample No. 15 and an amount of Ti is set to 2.0 is experimented as a sample No. "15-v3". According to the experiment, satisfactory results are obtained such that a durable reproduction power is 0.39 mW and average initial jitter is 6.68% being superior to that of the sample No. 15-v2 furthermore. In other words, it is understood that the optical disc of the sample No. "15-v3" satisfies the standard for the next generation in reproduction power output and initial jitter.

An optical disc in which an amount of Ge and value of Sb/Te are set to the same as those of the sample No. 15 and each amount of Sb and Te is slightly changed from those of the sample No. 15 and an amount of Ti is set to 3.0 is experimented as a sample No. "15-v4". According to the experiment, satisfactory results are obtained such that a durable reproduction power is 0.39 mW and average initial jitter is 6.78%. In other words, it is understood that the optical disc of the sample No. "15-v4" satisfies the standard for the next generation in reproduction power output and initial jitter.

An optical disc in which an amount of Ge and value of Sb/Te are set to the same as those of the sample No. 15 and each amount of Sb and Te is slightly changed from those of the sample No. 15 and an amount of Ti is set to 4.0 is experimented as a sample No. "15-v5". According to the experiment, satisfactory results are obtained such that a durable reproduction power is 0.39 mW and average initial jitter is 6.95%. In other words, it is understood that the optical disc of the sample No. "15-v5" satisfies the standard for the next generation in reproduction power output and initial jitter.

An optical disc in which an amount of Ge and value of Sb/Te are set to the same as those of the sample No. 15 and each amount of Sb and Te is slightly changed from those of the sample No. 15 and an amount of Ti is set to 5.0 is experimented as a sample No. "15-v6". According to the experiment, a durable reproduction power is 0.39 mW and average initial jitter is 8.14%. The results are inferior to those of the sample No. 15. In other words, it is understood that the optical disc of the sample No. "15-v6" does not satisfy the standard for the next generation in reproduction power output and initial jitter.

An optical disc in which an amount of Ge and value of Sb/Te are set to the same as those of the sample No. 15 and each amount of Sb and Te is slightly changed from those of the sample No. 15 and an amount of Ti is set to 6.0 is experimented as a sample No. "15-v7". According to the experiment, a durable reproduction power is 0.39 mW and average initial jitter is 9.22%. The results are inferior to those of the sample No. "15-v6" furthermore. In other words, it is understood that the optical disc of the sample No. "15-v7" does not satisfy the standard for the next generation in reproduction power output and initial jitter.

Since an error of the order of 0.2 dB occurs hereupon as a measurement error, it is assumed to be excellent that a change of C/N immediately after reproduction is started is less than 0.2 dB. Strength of a reproduction power is examined with respect to a C/N after 5 minutes elapsed of which deterioration caused by the reproduction power is less than 0.2 dB. By the examination, it is found that a C/N after 5 minutes elapsed enables to stand against up to 0.38 mW of the reproduction power. Consequently, it is understood that the optical disc 10 according to the embodiment five offers excellent durability against reproduction light and is one of optical discs satisfying the standard for the next generation.

Further, according to the results of the sample Nos. "15-v1" through "15-v7", it is understood that an amount of Ti within a range of 0.5 to 4.0 results in offering excellent initial jitter.

[Embodiment Six]

FIG. 9 is a table exhibiting durability against reproduction light and initial jitter with respect to recording layer compositions added with Ti to a recording layer of an optical disc according to an embodiment six of the present invention.

With referring to FIG. 9, an optical disc of sample No. 16 is explained next. In FIG. 9, a reference sign "16" in a "Sample No." column denotes a sample No. 16 shown in FIG. 13 that will be detailed later. Reference signs "16-v1" to "16-v7" correspond to states of durable reproduction power and average initial jitter when an amount of Ti is changed with respect to the sample No. 16.

By the sputtering method, a reflective layer 2, a first protective layer 3, a recording layer 4, and a second protective layer 5 are sequentially formed on a polycarbonate substrate 1 having a diameter of 120 mm through a similar method to that of the embodiment one. Then by using ultraviolet curable resin as an adhesive layer 6, a cover sheet layer 7 is adhered thereon. In this constitution, each film thickness of the reflective layer 2, the first protective layer 3, the recording layer 4, and the second protective layer 5 is 200 nm, 8 nm, 14 nm, and 36 nm respectively.

Further, compositions of the recording layer 4 in atomic percent are set to 0.5% of Ti, 11.1% of Ge, 68.8% of Sb, and 19.6% of Te. Ultraviolet ray is irradiated on the cover sheet layer 7 so as to harden the adhesive layer 6 sufficiently after the cover sheet layer 7 is adhered. Then, the sample No. 16 is initialized by using the Initializer installed with a laser beam having a spot diameter of 120 μm, wherein initializing conditions are such that a linear velocity and a feed pitch is fixed to 4 m/s and 40 μm respectively and a laser output is 570 mW.

The laser output for initializing the sample No. 16 hereupon is equal to that for a comparative example (will be explained later) made from GeSbTe. However, the output is a result of optimizing a laser power for TiGeSbTe. After initialization, an information signal modulated in 1–7 modulation is recorded in a groove of the sample No. 16 at a linear velocity of 5.28 m/s under recording conditions exhibited in a line of "sample No. 16" in FIG. 11, wherein recording strategy and recording power shown in FIG. 2 is as follows: P1=5.2 mW, P2=3.4 mW, P3=0.1 mW, P4=0.1 mW, T1=0.5T, T2=0.5T, T3=0.8T, and T4=0.8T, wherein 1T is defined as 15.1 nsec. Then, the recorded signal is reproduced and clock to data jitter is measured by slicing the reproduced signal along a center of amplitude.

Jitter is measured by the Time Interval Analyzer: model TA520 manufactured by Yokogawa Electric Corp. Initial jitter after first recording is 7.10% at a front end of a record mark and 6.94% at a rear end of the record mark. An average of both jitter is 7.02% and resulting in being recorded excellently (refer to a column of "16-v1" in FIG. 9).

Further, the same optical disc (sample No. 16-v1) is recorded with a single signal having a length of 2T according to the above-mentioned recording strategy. A C/N is measured while a track recorded with the single signal is reproduced in the still reproduction mode. At this moment, each C/N at immediately after and 5 minutes after performing the still reproduction is measured while a reproduction power is changed from 0.30 mW to 0.39 mW. Each C/N at immediately after and 5 minutes after the still reproduction is started is 50.2 dB and 50.1 dB respectively. A C/N is measured by a spectrum analyzer and is the average of 16 data.

In a case that the reproduction power is increased up to 0.38 mW, each C/N at immediately after and 5 minutes after the still reproduction is started is 51.2 dB and 51.2 dB respectively. In other words, the optical disc of the sample No. 16 sufficiently satisfies a C/N condition that is necessary for jitter of the single signal having the length of 2T alone to be 9% (refer to a line of sample No. "16-v1 to 16-v5" in FIG. 12).

As mentioned above, there is no difference between the C/N at "immediately after" and the C/N at "5 minutes after". In other words, it is understood that the optical disc offers a stable performance without deteriorating reproduction.

An optical disc in which an amount of Ge and value of Sb/Te are set to the same as those of the sample No. 16 and each amount of Sb and Te is slightly changed from those of the sample No. 16 and an amount of Ti is set to 1.0 is experimented as a sample No. "16-v2". According to the experiment, satisfactory results are obtained such that a durable reproduction power is 0.40 mW and average initial jitter is 6.95% being superior to that of the sample No. 16-v1. In other words, it is understood that the optical disc of the sample No. "16-v2" satisfies the standard for the next generation in reproduction power output and initial jitter.

An optical disc in which an amount of Ge and value of Sb/Te are set to the same as those of the sample No. 16 and each amount of Sb and Te is slightly changed from those of the sample No. 16 and an amount of Ti is set to 2.0 is experimented as a sample No. "16-v3". According to the experiment, satisfactory results are obtained such that a durable reproduction power is 0.40 mW and average initial jitter is 6.82% being superior to that of the sample No. 16-v2 furthermore. In other words, it is understood that the optical disc of the sample No. "16-v3" satisfies the standard for the next generation in reproduction power output and initial jitter.

An optical disc in which an amount of Ge and value of Sb/Te are set to the same as those of the sample No. 16 and each amount of Sb and Te is slightly changed from those of the sample No. 16 and an amount of Ti is set to 3.0 is experimented as a sample No. "16-v4". According to the experiment, satisfactory results are obtained such that a durable reproduction power is 0.40 mW and average initial jitter is 6.88%. In other words, it is understood that the optical disc of the sample No. "16-v4" satisfies the standard for the next generation in reproduction power output and initial jitter.

An optical disc in which an amount of Ge and value of Sb/Te are set to the same as those of the sample No. 16 and each amount of Sb and Te is slightly changed from those of the sample No. 16 and an amount of Ti is set to 4.0 is experimented as a sample No. "16-v5". According to the experiment, satisfactory results are obtained such that a durable reproduction power is 0.40 mW and average initial jitter is 7.25%. In other words, it is understood that the optical disc of the sample No. "16-v5" satisfies the standard for the next generation in reproduction power output and initial jitter.

An optical disc in which an amount of Ge and value of Sb/Te are set to the same as those of the sample No. 16 and each amount of Sb and Te is slightly changed from those of the sample No. 16 and an amount of Ti is set to 5.0 is experimented as a sample No. "16-v6". According to the experiment, a durable reproduction power is 0.40 mW and average initial jitter is 8.48%. The results are inferior to those of the sample No. 16. In other words, it is understood that the optical disc of the sample No. "16-v6" does not satisfy the standard for the next generation in reproduction power output and initial jitter.

An optical disc in which an amount of Ge and value of Sb/Te are set to the same as those of the sample No. 16 and each amount of Sb and Te is slightly changed from those of the sample No. 16 and an amount of Ti is set to 6.0 is experimented as a sample No. "16-v7". According to the experiment, a durable reproduction power is 0.40 mW and average initial jitter is 9.64%. The results are inferior to those of the sample No. "16-v6" furthermore. In other words, it is understood that the optical disc of the sample No. "16-v7" does not satisfy the standard for the next generation in reproduction power output and initial jitter.

Since an error of the order of 0.2 dB occurs hereupon as a measurement error, it is assumed to be excellent that a change of C/N immediately after reproduction is started is less than 0.2 dB. Strength of a reproduction power is examined with respect to a C/N after 5 minutes elapsed of which deterioration caused by the reproduction power is less than 0.2 dB. By the examination, it is found that a C/N after 5 minutes elapsed enables to stand against up to 0.40 mW of the reproduction power. Consequently, it is understood that the optical disc 10 according to the embodiment six offers excellent durability for reproduction light and is an optical disc satisfying the standard for the next generation.

Further, according to results of the sample Nos. "16-v1" through "16-v7", it is understood that an amount of Ti within a range of 0.5 to 4.0 results in offering excellent initial jitter.

[Embodiment Seven]

FIG. 10 is a table exhibiting durability against reproduction light and initial jitter with respect to recording layer compositions added with Ti to a recording layer of an optical disc according to an embodiment seven of the present invention.

With referring to FIG. 10, an optical disc of sample No. 17 is explained next. In FIG. 10, a reference sign "17" in a "Sample No." column denotes a sample No. 17 shown in FIG. 13 that will be detailed later. Reference signs "17-v1" to "17-v7" correspond to states of durable reproduction power and average initial jitter when an amount of Ti is changed with respect to the sample No. 17.

By the sputtering method, a reflective layer 2, a first protective layer 3, a recording layer 4, and a second protective layer 5 are sequentially formed on a polycarbonate substrate 1 having a diameter of 120 mm through a similar method to that of the embodiment one. Then, by using ultraviolet curable resin as an adhesive layer 6, a cover sheet layer 7 is adhered thereon. In this constitution, each film thickness of the reflective layer 2, the first protective layer 3, the recording layer 4, and the second protective layer 5 is 200 nm, 8 nm, 14 nm, and 36 nm respectively.

Further, compositions of the recording layer 4 in atomic percent are set to 0.5% of Ti, 14.5% of Ge, 64.8% of Sb, and 20.2% of Te. Ultraviolet ray is irradiated on the cover sheet layer 7 so as to harden the adhesive layer 6 sufficiently after the cover sheet layer 7 is adhered. Then, the sample No. 17 is initialized by using the Initializer installed with a laser beam having a spot diameter of 120 μm, wherein initializing conditions are such that a linear velocity and a feed pitch is fixed to 4 m/s and 40 μm respectively and a laser output is 570 mW.

The laser output for initializing the sample No. 17 hereupon is equal to that for a comparative example (will be explained later) made from GeSbTe. However, the output is a result of optimizing a laser power for TiGeSbTe. After initialization, an information signal modulated in 1–7 modulation is recorded in a groove of the sample No. 17 at a linear velocity of 5.28 m/s under recording conditions exhibited in a line of "sample No. 17" in FIG. 11, wherein recording strategy and recording power shown in FIG. 2 is as follows: P1=5.2 mW, P2=2.7 mW, P3=0.1 mW, P4=0.1 mW, T1=0.4T, T2=0.4T, T3=0.7T, and T4=0.7T, wherein 1T is defined as 15.1 nsec. Then, the recorded signal is reproduced and clock to data jitter is measured by slicing the reproduced signal along a center of amplitude.

Jitter is measured by the Time Interval Analyzer: model TA520 manufactured by Yokogawa Electric Corp. Initial jitter after first recording is 7.22% at a front end of a record mark and 7.06% at a rear end of the record mark. An average of both jitter is 7.14% and resulting in recording excellently (refer to a column of "17-v1" in FIG. 10).

Further, the same optical disc (sample No. 17-v1) is recorded with a single signal having a length of 2T according to the above-mentioned recording strategy. A C/N is measured while a track recorded with the single signal is reproduced in the still reproduction mode. At this moment, each C/N at immediately after and 5 minutes after performing the still reproduction is measured while a reproduction power is changed from 0.30 mW to 0.40 mw. Each C/N at immediately after and 5 minutes after the still reproduction is started is 50.2 dB and 50.2 dB respectively. A C/N is measured by a spectrum analyzer and is the average of 16 data.

In a case that the reproduction power is increased up to 0.38 mW, each C/N at immediately after and 5 minutes after the still reproduction is started is 51.3 dB and 51.3 dB respectively. In other words, the optical disc of the sample No. 17 sufficiently satisfies a C/N condition that is necessary for jitter of the single signal having the length of 2T alone to be 9% (refer to a line of sample No. "17-v1 to 17-v5" in FIG. 12).

As mentioned above, in the optical disc according to the embodiment 7, there is no difference between the C/N at "immediately after" and the C/N at "5 minutes after". In other words, it is understood that the optical disc offers a stable performance without deteriorating reproduction.

An optical disc in which an amount of Ge and value of Sb/Te are set to the same as those of the sample No. 17 and each amount of Sb and Te is slightly changed from those of the sample No. 17 and an amount of Ti is set to 1.0 is experimented as a sample No. "17-v2". According to the experiment, satisfactory results are obtained such that a durable reproduction power is 0.40 mW and average initial jitter is 7.05% being superior to that of the sample No. 17-v1 furthermore. In other words, it is understood that the optical disc of the sample No. "17-v2" satisfies the standard for the next generation in reproduction power output and initial jitter.

An optical disc in which an amount of Ge and value of Sb/Te are set to the same as those of the sample No. 17 and each amount of Sb and Te is slightly changed from those of the sample No. 17 and an amount of Ti is set to 2.0 is experimented as a sample No. "17-v3". According to the experiment, satisfactory results are obtained such that a durable reproduction power is 0.40 mW and average initial jitter is 7.02% being superior to that of the sample No. 17-v1. In other words, it is understood that the optical disc of the sample No. "17-v3" satisfies the standard for the next generation in reproduction power output and initial jitter.

An optical disc in which an amount of Ge and value of Sb/Te are set to the same as those of the sample No. 17 and each amount of Sb and Te is slightly changed from those of the sample No. 17 and an amount of Ti is set to 3.0 is experimented as a sample No. "17-v4". According to the experiment, satisfactory results are obtained such that a durable reproduction power is 0.40 mW and average initial jitter is 7.16%. In other words, it is understood that the optical disc of the sample No. "17-v4" satisfies the standard for the next generation in reproduction power output and initial jitter.

An optical disc in which an amount of Ge and value of Sb/Te are set to the same as those of the sample No. 17 and each amount of Sb and Te is slightly changed from those of the sample No. 17 and an amount of Ti is set to 4.0 is experimented as a sample No. "17-v5". According to the experiment, satisfactory results are obtained such that a durable reproduction power is 0.40 mW and average initial jitter is 7.28%. In other words, it is understood that the optical disc of the sample No. "17-v5" satisfies the standard for the next generation in reproduction power output and initial jitter.

An optical disc in which an amount of Ge and value of Sb/Te are set to the same as those of the sample No. 17 and each amount of Sb and Te is slightly changed from those of the sample No. 17 and an amount of Ti is set to 5.0 is experimented as a sample No. "17 v6". According to the experiment, a durable reproduction power is 0.40 mW and average initial jitter is 8.55%. The results are inferior to those of the sample No. 17. In other words, it is understood that the optical disc of the sample No. "17-v6" does not satisfy the standard for the next generation in reproduction power output and initial jitter.

An optical disc in which an amount of Ge and value of Sb/Te are set to the same as those of the sample No. 17 and each amount of Sb and Te is slightly changed from those of the sample No. 17 and an amount of Ti is set to 6.0 is experimented as a sample No. "17-v7". According to the experiment, a durable reproduction power is 0.40 mW and average initial jitter is 9.78%. The results are inferior to those of the sample No. "17-v6" furthermore. In other words, it is understood that the optical disc of the sample No. "17-v7" does not satisfy the standard for the next generation in reproduction power output and initial jitter.

Since an error of the order of 0.2 dB occurs hereupon as a measurement error, it is assumed to be excellent that a change of C/N immediately after reproduction is started is less than 0.2 dB. Strength of a reproduction power is examined with respect to a C/N after 5 minutes elapsed of which deterioration caused by the reproduction power is less than 0.2 dB. By the examination, it is found that a C/N after 5 minutes elapsed enables to stand against up to 0.40 mW of the reproduction power. Consequently, it is understood that the optical disc 10 according to the embodiment seven offers excellent durability against reproduction light and is one of optical discs satisfying the standard for the next generation.

Further, according to the results of the sample Nos. "17-v1" through "17-v7", it is understood that an amount of Ti within a range of 0.5 to 4.0 results in offering excellent initial jitter. An appropriate range of Ge is 3.4 to 14.5 and an appropriate range of Sb/Te is 2.1 to 4.0 hereupon although they will be detailed later.

Properties of each element constituting a recording layer according to the embodiments of the present invention are explained next. Ti is an element having a higher melting point of 1948 K and is extremely thermostable in comparison with Ge, Sb, and Te of which melting points are 700 K to 1200 K.

Further, Ti is such a stable substance that does not react to Ge, Sb, or Te, which is contained in a recording layer of the optical disc according to the embodiments of the present invention, or does not react to any materials forming a protective layer adjacent to the recording layer.

Therefore, excessively added Ti obstructs a phase change between crystal and amorphous of the recording layer while recording. However, by adding a proper amount of Ti, the Ti functions as an anchor in the recording layer and makes a mark edge sharper when forming a record mark, and resulting in reducing jitter.

Furthermore, it is supposed that an optical disc containing the proper amount of Ti can withstand reproduction light having a stronger power, because Ti is excellent in thermal durability because of an element having a high melting-point.

COMPARATIVE EXAMPLE

By the sputtering method, an Ag alloy as a reflective layer 2, $ZnS-SiO_2$ as a first protective layer 3, GeSbTe as a recording layer 4, and ZnS—SiO$_2$ as a second protective layer 5 are sequentially formed on a polycarbonate substrate 1 having a diameter of 120 mm. Then by using ultraviolet curable resin as an adhesive layer 6, a cover sheet layer 7 is adhered thereon. In this constitution, each film thickness of the reflective layer 2, the first protective layer 3, the recording layer 4, and the second protective layer 5 is 200 nm, 8 nm, 14 nm, and 36 nm respectively.

Further, compositions of the recording layer 4 in atomic percent are set to 8.7% of Ge, 69.7% of Sb, and 21.6% of Te. Ultraviolet ray is irradiated on the cover sheet layer 7 so as to harden the adhesive layer 6 sufficiently after the cover sheet layer 7 is adhered. Then, the comparative example is initialized by using the Initializer installed with a laser beam having a spot diameter of 120 μm, wherein initializing conditions are such that a linear velocity and a feed pitch is fixed to 4 m/s and 40 μm respectively and a laser output is 570 mW.

After initialization, an information signal modulated in 1–7 modulation is recorded in a groove of an optical disc according to the comparative example at a linear velocity of 5.28 m/s under recording conditions, wherein recording strategy and recording power shown in FIG. 2 is as follows: P1=5.2 mW, P2=2.7 mW, P3=0.1 mW, P4=0.1 mW, T1=0.4T, T2=0.4T, T3=0.7T, and T4=0.7T, wherein 1T is defined as 15.1 nsec. Then, the recorded signal is reproduced and clock to data jitter is measured by slicing the reproduced signal along a center of amplitude.

Jitter is measured by the Time Interval Analyzer: model TA520 manufactured by Yokogawa Electric Corp. Initial jitter after first recording is 7.7% at a front end of a record mark and 7.9% at a rear end of the record mark, and resulting in being able to record normally.

Further, the same optical disc (comparative example) is recorded with a single signal having a length of 2T according to the above-mentioned recording strategy. A C/N is measured while a track recorded with the single signal is reproduced in the still reproduction mode. At this moment, a reproduction power is set to 0.30 mW that is supposed not to deteriorate the optical disc. Each C/N at immediately after and 5 minutes after performing the still reproduction is 50.0 dB and 50.0 dB respectively.

While measuring a C/N, a C/N remains in 50.0 dB and never reaches to 51.0 dB, which is necessary for jitter of the signal having a length of 2T alone to be 9%, although a reproduction power is increased up to 0.36 mW that is the maximum durable power.

Since an error of the order of 0.2 dB possibly occurs as a measurement error, it is assumed to be excellent that a change of C/N before and after examining deteriorated reproduction is less than 0.2 dB.

FIG. 13 is a summary table exhibiting deteriorated reproduction and jitter with respect to the optical discs according to the embodiments one to seven of the present invention and the comparative example.

Compositions constituting the recording layer 4 other than the compositions detailed in the embodiments and the comparative example mentioned above are examined. The examined compositions are shown in FIG. 13. As it is apparent from FIG. 13, preferable compositions for an optical disc 10, which is composed of a GeSbTe system material as a phase-change type recording layer and offers strong durability against reproduction light as well as being applicable for an optical disc system using a blue laser beam, are as follows: respective composition range of Ge, Sb, and Te is such that Ge is more than 3.4% and less than 14.5% in atomic percent, Sb/Te is more than 2.1 and less than 4.0, deterioration of C/N by 0.3 mW of reproduction power is within 0.2 dB, and an initial jitter is less than 9%.

In addition thereto, it is experimentally proved that the preferable composition range is an initial state in which deterioration begins. Further details are explained hereinafter. Particularly, a range of Ge is explained first.

Increasing an amount of Ge improves contrast, and resulting in increasing resistance against environmental load. A minimum amount of Ge is defined as 3.4% (atomic percent). However, it may deviate a little in consideration of measurement error. In a case that an amount of Ge is small, it is experimentally evident that jitter is hardly decreased, particularly. However, a larger amount of Ge is not always the better.

In a case of increasing an amount of Ge, an amount of Sb decreases relatively, and resulting in decreasing a crystallizing speed. In other words, recording and rewriting in higher linear velocity is not enabled by a slower crystallizing speed.

Further, it is experimentally evident that a smaller amount of Sb makes a crystallizing speed slower even in a same Sb/Te ratio. In this case, insufficient erasing possibly occurs by such a slower crystallizing speed while rewriting.

On the other hand, increasing an amount of Ge makes a crystallizing speed higher. A recording layer crystallized by a higher temperature offers higher durability such that deteriorated reproduction is extremely low when recorded. However, if a crystallizing temperature is raised too much, initializing a recording layer is apt to be harder. An upper limit of Ge amount is 14.5% (atomic percent) as far as it can be examined.

A ratio of Sb/Te is explained next. As mentioned above, a ratio of Sb/Te affects a crystallizing speed. In a case that the ratio is larger, a crystallizing speed increases, and resulting in enabling to record and rewrite by a faster linear velocity. On the contrary, in a case that the ratio is small, a crystallizing speed decreases. In the embodiments of the present invention, the lower limit of the ratio is defined as 2.1 because crystallization during the initializing process becomes harder in the region of 2.1.

Further, in a case that the ratio is less than 2.1, a crystallization state becomes unstable and such defects that contrast is deteriorated and overwriting is disabled are apt to happen.

On the other hand, the upper limit of the ratio of Sb/Te is defined as 4.0. However, in a case that the ratio is increased, an amorphous mark is not formed sufficiently because a recording layer is easily crystallized. If an amorphous mark happen to be formed, a recorded mark happens to disappear when reproducing the recorded part in the still reproduction mode because the recorded amorphous mark is weak in strength for reproduction light.

The composition of the sample No. 18 shown in FIG. 13 that is examined as the comparative example offers excellent characteristics by itself and enables to withstand up to 0.35 mW of reproduction power. However, as mentioned above, the sample No. 18 can hardly realize that jitter of a signal having a length of 2T alone is less than 9% because a durable reproduction power is at most 50.0 dB. In other words, the sample No. 18 disables to become an optical information recording medium that is intended to be realized by the present invention, wherein the optical information recording medium to be realized by the present invention can withstand reproduction light in higher output satisfying the standard for the new generation and enables to be recorded in lower jitter.

As it is apparent from the detailed description mentioned above, it is understood that the constitution of each embodiment according to the present invention enables to offer advantageous results in characteristics, which are impossible to be realized by a conventional recording material of GeSbTe only.

As mentioned above, the present invention provides an optical disc, which can withstand reproduction light in high output that is never achieved by the conventional recording material of GeSbTe system and can be recorded in lower jitter.

It should be understood that many modifications and adaptations of the invention will become apparent to those skilled in the art and it is intended to encompass such obvious modifications and changes in the scope of the claims appended hereto.

What is claimed is:

1. An optical information recording medium comprising at least a phase-change type recording layer provided on a substrate, being conducted to record and erase information by changing a phase of the phase-change type recording layer by irradiating light, the phase-change type recording layer further composed of $Ti_w Ge_x Sb_y Te_z$, wherein each of w, x, y and z is in atomic percent and satisfies following relations:

$0.5 \leq w \leq 4.0$, $3.4 \leq x \leq 14.5$, $2.1 \leq y/z \leq 4.0$ and $w+x+y+z=100$.

* * * * *